(12) United States Patent
Kahle et al.

(10) Patent No.: US 7,228,206 B2
(45) Date of Patent: Jun. 5, 2007

(54) ELECTRICAL SYSTEM FOR A SHIP

(75) Inventors: Jens Kahle, Norderstedt (DE); Bernd Kallbach, Oststeinbek (DE); Hans-Peter Willer, Jesteburg (DE)

(73) Assignee: Siemens Aktiengesellschaft, Munich (DE)

( * ) Notice: Subject to any disclaimer, the term of this patent is extended or adjusted under 35 U.S.C. 154(b) by 668 days.

(21) Appl. No.: 10/470,803

(22) PCT Filed: Jan. 18, 2002

(86) PCT No.: PCT/DE02/00151

§ 371 (c)(1),
(2), (4) Date: Jan. 28, 2004

(87) PCT Pub. No.: WO02/061912

PCT Pub. Date: Aug. 8, 2002

(65) Prior Publication Data

US 2004/0117077 A1    Jun. 17, 2004

(30) Foreign Application Priority Data

Feb. 1, 2001   (DE) ................ 101 04 892

(51) Int. Cl.
*G05D 1/00*    (2006.01)
*G05D 3/00*    (2006.01)
(52) U.S. Cl. .................. 701/1; 701/21; 701/33; 701/36; 307/38

(58) Field of Classification Search ............. 701/1, 701/21, 33, 36, 48, 53; 307/11, 38; 440/1
See application file for complete search history.

(56) References Cited

U.S. PATENT DOCUMENTS 4,682,294 A    7/1987   Duc et al. .............. 307/38
5,627,414 A *  5/1997   Brown et al. ........... 205/726

FOREIGN PATENT DOCUMENTS

WO    WO 96/08784    3/1996
WO    WO 99/19956    4/1999

OTHER PUBLICATIONS

Deppe, Manfred. "SIMATIC and PROFIBUS-DP—The Ideal Combination for Distributed Control." *Engineering & Automation XVIII* (1996) No. 2 pp. 15-17.
Selch and Stripf, Wolfgang. "STEP 7—The Future-Oriented Programming System for the New SIMATIC Programmable Controllers." *Engineering & Automation XVI* (1994) No. 2 pp. 5-6.

* cited by examiner

*Primary Examiner*—Gertrude A. Jeanglaude
(74) *Attorney, Agent, or Firm*—Harness, Dickey & Pierce, P.L.C.

(57) ABSTRACT

The invention relates to an electrical system for a ship, comprising generators, electrical consumers, such as electric motors, and an on-board power supply system with switchgears etc. as the components of the system. The electrical system is further characterized in that supplies sufficient electrical energy in all operating states of the ship and that the system components are automatically controlled by digitized standard modules.

28 Claims, 10 Drawing Sheets

ELECTRICAL SYSTEM FOR A SHIP

This application is the national phase under 35 U.S.C. § 371 of PCT International Application No. PCT/DE02/00151 which has an International filing date of Jan. 18, 2002, which designated the United States of America and which claims priority on German Patent Application number DE 101 04 892.0 filed Feb. 1, 2001, the entire contents of which are hereby incorporated herein by reference.

FIELD OF THE INVENTION

The invention generally relates to a marine electrical system. Preferably, it relates to a system having generators, electrical loads, such as electric motors and an on-board power supply system with switchgear assemblies etc. as system components, with the electrical system ensuring that adequate electrical power is provided in all operating states of the ship.

BACKGROUND OF THE INVENTION

Until now, measurement, control and regulation devices which operate on an analog basis have normally been used in maritime vessels, if appropriate with an associated digital control and observation level. A mixed system such as this has admittedly been proven, but has design disadvantages. Surprisingly, it has been found that a completely digitized version can be more advantageous and, in particular, more cost-effective. This is particularly true when it is intended to carry out continual optimization, by reconfiguration, that is to say by external actions, or by way of an automatic system.

SUMMARY OF THE INVENTION

According to an embodiment of the invention, the known hybrid system is produced by digital control and regulation based on standard modules.

BRIEF DESCRIPTION OF THE DRAWINGS

The design of the system will become evident from all of the detail of the attached system description, with the figures contained in this description.

DETAILED DESCRIPTION OF THE PREFERRED EMBODIMENTS

Figure 1:
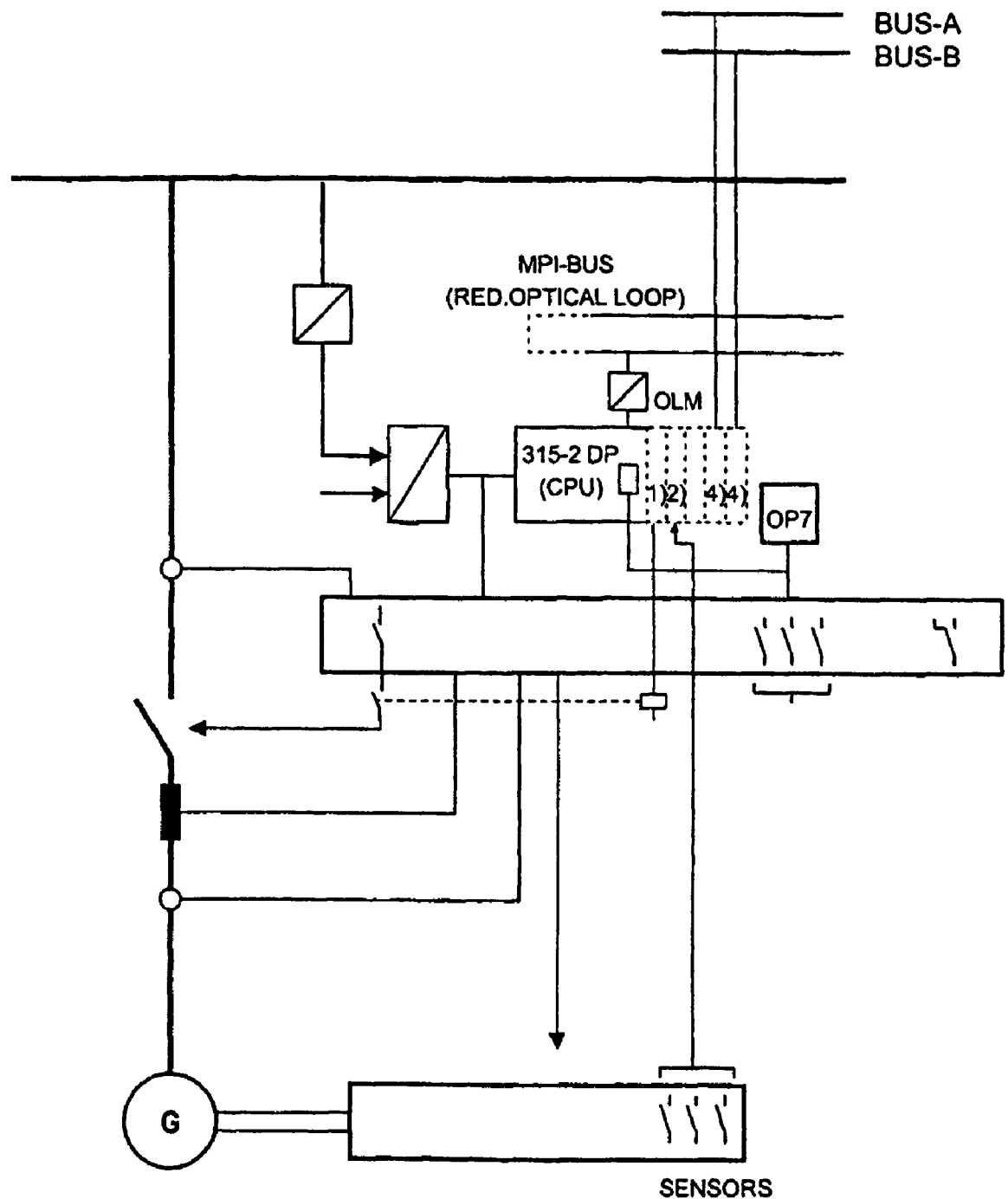
FIG. 1 illustrates the system configuration.
Figure 2:
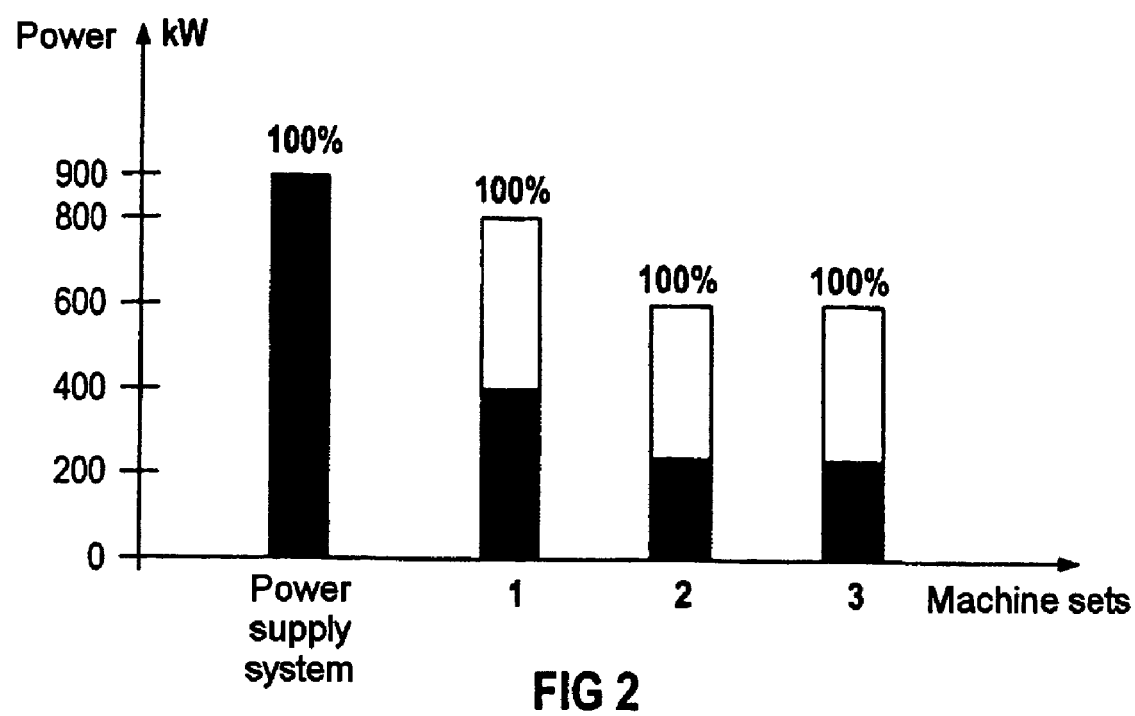
FIG. 2 illustrates a bar graph.

General Object of a Power Management System

The major task of the SIMOS PMA 71 power management system is to ensure that adequate electrical power is provided for all the operating states of the marine vessel. As the power demand on marine vessels increases, economic generation of power is, however, becoming virtually just as important as freedom from interruption.

The SIMOS PMA 71 automatic power generator system is based on the requirement of maintaining electrical power automatically during the various operating modes. In the event of faults in the on-board power supply system, all the necessary measures are initiated in order to supply the loads with electrical power with as little interruption as possible, while at the same time preventing damage.

SIMATIC-S7 standard components are used for each machine unit, plus a generator protection device/measurement transducer and an OC 24V/DC 24V isolating transformer. The generator protection device/measurement transducer, DC 24V/DC 24V isolating transformer and SIMATIC S7 for each individual machine set controller form an independent system. This ensures that only one machine unit is also affected if one system fails.

In addition to the 24V supply from the marine vessel's battery, the generator protection device has an internal voltage supply from the generator voltage. If the SIMATIC-S7 is likewise to be supplied by a redundant power supply, this must be provided by the switchgear assembly manufacturer (for example a DC 24V power supply, fed from the busbar voltage) in order that the operation of the PMA is ensured even if the higher-level battery power supply fails.

The generator protection device can also be used on its own, without SIMATIC-S7, in which case it then provides only some of the functions (generator protection, synchronization). A PMA coupling switch, a PMA land connection and a PMA emergency diesel can be supplied in addition to the PMA generator. These have particular functions which differ from the PMA generator.

Some classification organizations require an additional, independent diesel protection system (overspeed, lubricating oil pressure). The PMA 71 diesel protection has only second-priority functions. The main diesel protection is not part of the PMA 71.

Power and Functional Scope

On-board power supply system monitoring (black-out, underfrequency, overfrequency, undervoltage, overvoltage)

Load-dependent starting of machine sets (overcurrent, overload)

Fault-dependent starting of machine sets

Overcurrents and reverse power protection of the generator

Disconnection of unimportant loads in three stages

Automatic stopping of machine units taking into account the available power (underload)

Manual starting of machine sets (with two or more start attempts, if set), and manual stopping (with previous reduction in the load of the machine set, provided that another machine set is also connected to the busbar)

Automatic synchronization of machine sets

Automatic regulation of the on-board power supply system frequency

Automatic real load matching between the machine sets

Short-circuit protection

Fault indication integrated in the control panel

Load demand automatic system (option)

Special Features

High availability by structured design (fault in one PMA 71 does not influence the operation of the other machine sets)

Simple servicing and fault localization by virtue of modular design

Light-emitting diodes on all binary SIMATIC-S7 inputs and outputs

Easy replacement of the assemblies in the SIMATIC-S7 by plug-in technology

Easy matching of the system to different machine sets by way of the generator protection device/measurement transducer Little wiring complexity through the use of prefabricated plug-in technology General information:

Operational messages and fault messages are indicated on the control panel in the form of text.

Abbreviations may be necessary, depending on the space in the control panel display.

The type of message (operational or defect message) is shortened in this description, in abbreviated form, using BM (Operational message)

SM (Fault message)

The following abbreviations are used

DG (Diesel generator)

WG (Shaft generator)

HATA (Main switch panel)

B&B (Control and observation)

System Design

Individual Machine Set Components

The components of the SIMOS PMA 71 automatic power generator system are intended for decentralized installation using standard switch panels (associated with the generator panel) or for central installation in standard cabinets. For central installation, the generator protection device must be installed in the respective generator panel, while the other components can be installed together, centrally, in one cabinet.

Each machine set has the following associated components, as standard:

Programmable logic controller (PLC, SIMATIC S7-300)

Generator protection/synchronization device/measurement transducer (GENOP 71)

DC 24V/DC 24V isolating transformer

Control panel (OP).

If the PMA is installed in a central cabinet, then the GENOP 71 generator protection device must be installed in the corresponding generator panel in the main switch panel. Other components can be installed in the central cabinet.

Plug Connections/Connections

Bus Couplings

The components of a machine set (PLC, GENOP 71, OP) are connected to one another via Profibus DP. The PLCs for the various machine sets are connected via MPI coupling.

Peripherals

The external lines are connected via connecting modules (with screw connections). The modules for digital output signals are fitted with relays. (DC isolation between the output signals). These connecting modules are connected to the input and output assemblies of the SIMATIC-S7 via front plugs and plug-in cables.

Generator Protection Device/Measurement Transducer

The following signals must be supplied to the generator protection device/measurement transducer 3-phase generator voltage, (100V AC signal)

3-phase power supply system voltage, (100V AC signal)

one current transformer for each phase (1A AC signal)

These cables must be routed separately from the control cables (separate cable duct) within a cabinet or within a switch panel when they are laid.

Shielding of the Cable and Lines

When laying signal lines and/or supply lines outside a cabinet/switch panel, lines and cables which carry a voltage of 230 V or more must be separated by a minimum distance of 10 cm.

FIG. 1 illustrates the system configuration.

Machine Set Control

The following operating modes are possible:

Local manual

Local semiautomatic

Automatic operation

Operation in the "Local Manual" Mode

The Local manual mode is normally selected for servicing tasks and for starting and stopping machine sets "locally". In this operating mode, the machine set is started and stopped with the PMA 71 being bypassed. The manual/automatic selector switch is switched to the "manual" position for switching.

The operating mode is indicated as "MANUAL" on the control panel.

The "manual/automatic" selector switch is arranged in the HATA.

In the Local manual mode, the automatic functions and operation via the control panel are inhibited. The display functions are operative. Speed adjustments and the switching on of the generator switch can be carried out only manually. The required devices for speed adjustment and control of the generator switch must be supplied by the switch panel manufacturer. Safety functions (disconnection in the event of overspeed, minimum lubricating oil pressure, maximum cooling water temperature etc. are still operative. When the generator switch is switched on, the generator protection is also operative.

Synchronization

Manual synchronization is carried out by way of a check synchronization aid. Once the machine set has been started manually, the generator frequency is matched to the power supply system frequency by manual adjustment (from the switch panel). The "ENABLE KEY" must be pressed in order to switch on the generator switch. The switch is switched on by the synchronization aid at the next zero crossing. In the event of a blackout, the generator switch can be switched on directly by way of the "SWITCH ON" key.

Operation in the "Local Semiautomatic Mode"

Precondition: the "manual/automatic" selector switch is in the "automatic" position. Local semiautomatic is selected by pressing the "SEMI" key on the control panel. The operating mode is indicated as "SEMI" on the control panel. The following functions can be carried out from the control panel in the semiautomatic mode:

Starting of the machine

Stopping of the machine

Starting of synchronization

In order to avoid incorrect selections, additional confirmation with the "CONFIRM" key is required for important functions.

The safety functions (disconnection in the event of overspeed, minimum lubricating oil pressure, maximum cooling water temperature and generator protection) are operative. In the event of a fault, the diesel set is stopped as in the automatic mode, but no start command is issued to the standby machine set.

Starting of the Machine Set

When the "START" key is operated, the "PRESS TO CONFIRM" message is displayed for an adjustable time on the control panel. However, the command is not carried out unless the "CONFIRM" acceptance key is operated within this time. If this is not done, the request is rejected.

The start command can be given only if the motor is stationary, that is to say it has not reached self-sustaining speed and the generator voltage. If the "CONFIRM" key is operated during this time period, the start command is given. At the same time, the BM "START VALVE" appears on the display. The start command is canceled by the signal "self-sustaining speed reached" or "generator voltage>85%". The start command is given only for an adjustable time (start time).

The "self-sustaining speed" or "generator voltage>85%" signal results in BM "OPERATION" being displayed. If the "self-sustaining speed" or "generator voltage>85%" signal is not produced after two or more start attempts, then a further start command is issued.

Starting of Synchronization

The synchronization process can be carried out in two different ways:

without load distribution after synchronization
with load distribution after synchronization Synchronization without Load Distribution On operation of the "GEN. SWITCH ON" key, the "PRESS TO CONFIRM" message appears on the control panel for an adjustable time. However, the command is not carried out unless the "CONFIRM" acceptance key is operated within this time. If this is not done, the request is rejected.

The automatic synchronization process is now started, and the generator switch is switched on. The present mode of operation and the real power being emitted from the machine set are now displayed on the control panel. No automatic load distribution is carried out. The load distribution can be changed manually.

Synchronization with Load Distribution

This function can be used only in the automatic mode. Operating the "AUTO" key results in a change to AUTO. After the change, the automatic synchronization is started, and the generator switch is switched on. Automatic load adjustment starts after switching on.

Switching on the Generator Switch in the Event of a Blackout

In the event of a blackout, the generator switch is switched on as follows:

by pressing the "GEN. Switch ON" key and "CONFIRM"
or
by switching to automatic

Stopping the Machine Set

When the "STOP" key is operated, the "PRESS TO CONFIRM" message is displayed on the control panel for an adjustable time. However, the command is not carried out unless the "CONFIRM" acceptance key is operated within this time. If this is not done, the request is rejected.

During parallel operation, a "Stop with load reduction" is carried out first of all. The BM "LOAD RED" is displayed. "Lower" adjustment pulses are emitted until the machine set load has been reduced to below the "Gen Power Minimum" limit value. The generator switch is then switched off. When the generator switch has been switched off, the machine set continues to run for a certain time, for cooling. The "NO-LOAD RUN-ON" message is displayed on the control panel. Once the no-load run-on time has elapsed, the machine set is stopped. When the stop command is emitted, the BM changes from "NO-LOAD RUN-ON" to "STOP". After completion of the stop command, the machine set is ready to be started once again.

The "NO-LOAD RUN-ON" can be switched off (this is defined in the configuration section). In this case, the machine set is stopped immediately after the generator switch is switched off.

Switching off the Generator Switch

The operation of the "GEN. SWITCH OFF" key results in the "PRESS TO CONFIRM" message being displayed for an adjustable time on the control panel. However, the command is not carried out unless the "CONFIRM" acceptance key is operated within this time. If this is not done, the request is rejected. In the parallel mode, a "Stop with load reduction" is carried out first of all. The BM "LOAD RED" is displayed. "Lower" adjusting pulses are emitted until the load on the machine set is below the "Gen. Power Minimum" limit value. The generator switch is then switched off.

Operation in the "Automatic Mode"

The automatic mode is selected by pressing the "AUTO" key on the control panel. The operating mode is displayed as "AUTO" on the control panel.

In the automatic mode, starting (standby start) and stopping (emergency stop, underload etc.) are carried out automatically or on request via a control and observation system.

Starting in the Automatic Mode

In the automatic mode, the starting process is initiated when the machine set is at "Standby" and a request is made by another machine set or by the higher-level control system.

The BM "START" appears on the display.

The start command is canceled in response to the "Self-sustaining speed reached" or "Generator voltage>85%" signal. The start command is issued only for an adjustable time (start time).

The "self-sustaining speed" signal results in the BM "OPERATION" being displayed.

If the "self-sustaining speed" or "generator voltage>85%" signal is not produced after two or more start attempts, then a further start command is issued.

Stopping in the Automatic Mode

An undelayed stop command (emergency stop, short circuit, reverse power etc.) results in the generator switch being switched off immediately. If the machine set is stopped by an underload or by a remote stop via the control and monitoring, and is being operated in the parallel mode, then a "Stop with load reduction" is carried out first of all.

The BM "LOAD RED" is displayed. "Lower" adjusting pulses are emitted until the load on the machine set has been reduced below the "Gen. Power Minimum" limit value. The generator switch is then switched off. When the generator switch is switched off, the machine set continues to run for a certain time for cooling. The "NO-LOAD RUN-ON" message appears on the control panel. Once the no-load run-on time has elapsed, the machine set is stopped. When the stop command is emitted, the BM changes from "NO-LOAD RUN-ON" to "STOP". After completion of the stop command, the machine set is ready to be started again.

The "NO-LOAD RUN-ON" can be switched off (this is defined in the configuration section). In this case, the machine set is stopped immediately after switching off the generator switch.

Start Fault

The starting process with one or more starting attempts is the same in the automatic and semiautomatic modes. If the "self-sustaining speed" or "generator voltage>85%" signal is not produced after two or more start attempts, then a stop command is issued. The following messages are issued:

"BLOCKED" (BM)
"START FAULT" (SM)

An additional command is issued in the automatic mode. Once the "STOP" command has disappeared, the defect message is acknowledged, and the machine set is ready to be started again. Resetting is not possible in the automatic mode.

Adjustment of the Start and Stop Times

The start time, the pause time between the start attempts and the stop time must be adjusted in accordance with the requirements for the machine set. The same time values are set for the automatic and semiautomatic modes. The adjustment is carried out from a control panel. The number of start attempts can also be adjusted.

| Standard settings: | |
|---|---|
| Start time | 5 s |
| Pause time | 5 s |
| Stop time | 30 s |
| Number of start attempts | 3 |

No-Load Run-on

A no-load run-on is recommended for some types of machine set in order to cool the machine set before stopping it. The no-load run-on is controlled by the PMA 71. The control panel can be used to set the time for which the no-load run-on is carried out. The no-load run-on is active in the local semiautomatic mode and in the automatic mode. The BM "NO-LOAD RUN-ON" is displayed during this time.

Blocking of the Control Panel

Precondition:

Local semiautomatic mode

Machine set stationary

Blocking of the machine set is envisaged for servicing work. When the "ENTER" key is operated, the control menu is overlaid. The submenu "INPUT COMMANDS" is selected using the arrow key, a "1" is entered in the "block machine set" field, and "ENTER" is pressed for confirmation. The display field can be reselected using the "ESC" key. The following SM is displayed:

"CONTROL PANEL BLOCKING"

Reset Blocking

Select the submenu once again. Instead of "1", now enter "0" and confirm with "ENTER". This resets the function.

Blocking Via a Blocking Switch

Most diesel sets have a "BLOCKED/LOCAL/REMOTE" selector switch, which can be switched over for servicing work. The selector switch must be switched for PMA 71. The "BLOCKED/LOCAL" positions block any start capability by the PMA 71. Depending on the selector switch position, either "BLOCKED" or "LOCAL" is displayed on the control panel.

However, the running machine set is not stopped. The monitoring for the machine set (overspeed, lubricating oil pressure, etc.) still remains in action. If a start attempt is made in the local semiautomatic mode, then the following message appears on the control panel:

"MACHINE SET BLOCKED VIA BLOCKING SWITCH"

Acknowledgement of Alarm Messages

Alarm messages are displayed in blinking form in the lower two message lines on the control panel, and they can be acknowledged using the "ACK" key. If the alarm message (for example an overvoltage) is no longer current, then it is deleted from the message buffer by operating the "ACK" key. If the message persists externally, then it changes from a blinking light to a continuous light on acknowledgement, and is still indicated on the display. If the message disappears externally, then it is also deleted from the message buffer, and is no longer indicated on the display.

Existing already acknowledged messages can be displayed using the ↑↓ keys.

Resetting Blockings

Blockings of the machine set (for example initiated by an overspeed or a short circuit on the busbar etc.) are displayed on the control panel by way of the "BLOCKED" operating message, and must be reset by operating the "CONFIRM" key. Resetting can be carried out only when the machine set is stationary.

Initial Lubrication

The PMA 71 provides one output (floating contact) for controlling the initial lubrication. The following functions can be set on the control panel.

No initial lubrication

Continuous initial lubrication

Cyclic initial lubrication

Initial lubrication before start

It is also possible to select whether initial lubrication should be carried out in the standby mode, in the automatic mode, or in the automatic mode and in the local semiautomatic mode.

Continuous Initial Lubrication

If this function is selected, the machine set will be initially lubricated continuously as long as it is not running.

The initial lubrication process is started when the "self-sustaining speed" and "generator voltage>85%" signals have disappeared. The initial lubrication process ends when the "self-sustaining speed" or "generator voltage>85%" signals appear.

If the blocking switch is inserted on the machine set, the initial lubrication is switched off.

Cyclic Initial Lubrication

When this function is selected, the machine set is initially lubricated cyclically, for as long as it is not running.

The times can be set on the control panel.

| Standard settings: | |
|---|---|
| Initial lubrication time | 2 min |
| Pause time | 2 hours |

The initial lubrication is started when the "self-sustaining speed" and "generator voltage>85%" signal have disappeared. The initial lubrication process ends when the "self-sustaining speed" or "generator voltage>85%" signals appear. If the blocking switch is inserted on the machine set, then the initial lubrication is switched off.

Initial Lubrication Before Start

This function provides initial lubrication for the machine set for an adjustable time, with the machine set then being started. However, the time that has passed since the last initial lubrication was carried out is checked. If the time is too long, initial lubrication is carried out. If the time is shorter than set, starting is carried out immediately. The times can be set on the control panel.

| Standard settings: | |
|---|---|
| Initial lubrication time | 30 s |
| Longest time for start without initial lubrication | 5 min |

A start without initial lubrication is carried out in the event of a "Blackout".

Initial Lubrication Monitoring (Option)

A contact from an external initial lubrication system is required for this function. The alarm is evaluated with a delay. Once the delay time has elapsed, the machine set is blocked. The delay time can be set on the control panel.

The following messages are output on the control panel:

| | |
|---|---|
| "BLOCKED" | (BM) |
| "LUBRICATING OIL PRESSURE FAULT" | (SM) |

Blocking is active in the automatic mode and in the local semiautomatic mode. Resetting is usually impossible as long as the alarm is active. The alarm is suppressed in the event of a "Blackout".

Preheating

The PMA 71 has one output (floating contact) for controlling the preheating. It is possible to select whether the initial lubrication should be carried out in the standby mode, in the automatic mode or in the automatic mode and in the local semiautomatic mode.

The preheating is started when the "self-sustaining speed" and "generator voltage>85%" signals have disappeared. The preheating ends when the "self-sustaining speed" or "generator voltage>85%" signals appear. If the blocking switch is inserted on the machine set, then the preheating is switched off.

Slow Turn (Option)

This function slowly rotates the crankshaft of the diesel set, and then starts it. However, the time which has passed since the machine set was last started is checked. If the time is too long, slow turning is carried out. If the time is shorter than set, starting is carried out immediately. The time can be set on the control panel.

| Standard settings: | |
|---|---|
| Time for slow turn | 10 s |
| Longest time for start without slow turn | 2 hours |

Starting is carried out without any slow turn in the event of a "blackout".

"Self-Sustaining Speed" Signal

The PMA 71 requires the "self-sustaining speed" (self-sustaining speed=contact closed) signal for various functions. The speed detection (for example a speed relay) is not part of the PMA 71.

Safety Functions

The PMA 71 allows safety functions to be provided. Four digital inputs with wired discontinuity monitoring can be used as standard. Normally, these are used as follows:

| | |
|---|---|
| No. 1: | "Overspeed" |
| No. 2: | "Minimum lubricating oil pressure" |
| No. 3: | "Maximum cooling water temperature" |
| No. 4: | Spare (for example "Minimum cooling water pressure") |

Further inputs may optionally be provided.

The machine set must be equipped with appropriate sensors. For wire discontinuity monitoring, each sensor contact is bridged by a 5.6 kiloohm resistor. The PMA 71 identifies the resistance as follows:

| | | |
|---|---|---|
| Resistance ~8 kΩ | (Wire discontinuity or no resistor in parallel): | Wire discontinuity |
| Resistance ~5.6 kΩ | (Contact open with resistor in parallel): | No stop |
| Resistance ~0 | (Contact closed): | Undelayed stop |

In order to prevent initiation by short interference pulses, the alarms 2 . . . 4 are provided with a delay time. This time can be selected from the control panel. The standard setting is one second. When one of these alarms occurs, the machine set is stopped and blocked immediately. In the automatic mode, a standby machine set is started.

The following messages are displayed on the control panel:

| | |
|---|---|
| "BLOCKED" | (BM) | and the corresponding reason message:

| | |
|---|---|
| "OVERSPEED" | (SM) or |
| "MINIMUM LUBRICATING OIL PRESSURE" | (SM) or |
| "HIGH COOLING WATER TEMPERATURE" | (SM) or |
| "ALARM NO. 4" | (SM) |

Undelayed Stop/Delayed Stop

The safety disconnection can be delayed or undelayed. The maximum cooling water temperature criterion, for example, requires either undelayed or delayed disconnection depending on the machine set type (this is defined in the configuration section). If delayed disconnection is provided, then the BM "DELAYED STOP" is first of all output on the control panel if the cooling water temperature is exceeded. Once a delay time has elapsed, the machine set is then stopped. The delay time can be set on the control panel.

Speed/Time-Dependant Enabling of the Alarms

When the machine set is not running, some values (for example lubricating oil pressure) will be below the alarm point. Whilst the machine set has been started, these values require some time to reach a normal level. For this reason, the alarms can be blocked until a delay time has elapsed. (Delay time 1 or delay time 2). Alarm No. 2 (lubricating oil pressure) is blocked until the delay time 1 has elapsed.

| Standard settings: | |
|---|---|
| Monitoring time 1 | 15 s |
| Monitoring time 2 | 45 s |

The monitoring time 1 is started by the "self-sustaining speed" or "generator voltage>85%" signals. Once this time has elapsed the monitoring time 2 is started.

Alarm Blocking

One floating contact is available for alarm blocking. This output is active when the machine set is not running, and until the monitoring time 1 has elapsed after starting of the machine set. This signal makes it possible to block alarms from an external alarm system when stationary or while the machine set is running up.

Emergency Stop

A digital input is provided for the emergency stop function. An "emergency stop" pushbutton can be connected here. This function initiates an immediate stop, and blocking of the machine set. The function is active in the automatic mode and in the local semiautomatic mode, but only when the machine set is running, for example when the signals "self-sustaining speed" or "generator voltage>85%" are present.

The following messages are displayed on the control panel:

| | |
|---|---|
| "BLOCKED" | (BM) |
| "EMERGENCY STOP" | (SM) |

The "emergency stop" function does not initiate a standby start. It should be remembered that emergency stopping of a machine set can cause a blackout when the corresponding machine set is the only one connected to the power supply system, or when the remaining machine set is overloaded. For safety reasons, the emergency stop valve should also be operated directly, bypassing the PMA 71.

Emergency Stop Valve

Some machine sets also have an emergency stop valve in addition to the normal stop valve. This valve is operated when the machine set is intended to be stopped as quickly as possible (undelayed stop, emergency stop, short circuit, etc.). The PMA 71 has one output for operating this valve.

Suppression Valve

The PMA 71 provides one output for operating a suppression valve. This valve is operated when the machine set is not running, and is deactivated with a delay by the "self-sustaining speed" or "generator voltage>85%" signals. The delay time can be set on the control panel.

Initial Alarm (Option)

Precondition:

Automatic Mode

This function is required to start a standby machine set as a precaution, in order to prevent an undelayed stop being required. The signal can come directly from the machine set as an initial alarm, or as a group alarm from the alarm system. (For example, initial alarm as lubricating oil pressure and cooling water temperature). The control panel can be used to select whether the faulty machine set should be stopped (with a previous load reduction), or should remain connected to the power supply system.

The following messages are displayed on the control panel:

| | |
|---|---|
| "INITIAL ALARM" | (BM) |

The message is acknowledged by operating the "RESET" key.

Remote Control

If the PMA 71 is connected to a higher-level control and observation system, then the following control actions are possible:

Start the machine set

Stop the machine set

Activate/deactivate the connection and disconnection chain

Activate/deactivate the UBL mode

Connect/disconnect the land connections

Connect/disconnect the coupling switches

Furthermore, the actual values such as the machine set real power, currents, voltages and frequency are provided and can be processed further in a standard data module. In order to transfer the control authorization to the control and monitoring system, the "remote" key must be operated on the OP 7.

The operating mode is displayed as "REMOTE" on the control panel. The OP 7 cannot be used for control purposes during remote control. The "semi" or "automatic" key must be operated in order to switch control back to the OP 7. Further information can be found in the operating instructions for the appropriate control and monitoring system.

Control of Shaft Generators

General Note:

The description covers only control of the WGA 23D and the conventional WG.

WGA 23D

The WGA 23D is a shaft generator control system comprising a shaft generator, a static converter and a wattless component machine. The converter is used to convert the frequency of the shaft generator to the busbar frequency. This can be done within a range from 40% to 100% of the machine speed. Parallel operation between the WGA and diesel generators is possible.

The WGA 23D is used in marine vessels with fixed-pitch propellers and variable-pitch propellers. For marine vessels with fixed-pitch propellers, the speed of the vessel can be controlled only via the speed of the main machine. For vessels with variable-pitch propellers, the speed of the vessel is regulated by the speed of the main machine and by the propeller pitch. The WGA 23D thus allows shaft generator operation over a wide speed range.

| Standard values: | |
|---|---|
| Speed of the main machine | WGA 23D power margin |
| 100% → 75% | 100% |
| 75% → 40% | 100% → 50% |

WG Control Via Epicyclic Gearing (for Example Renck)

In this case, the shaft generator is coupled to the main machine via epicyclic gearing. Once again, continuous parallel operation is possible in this case, in the range from 70% to 100% of the machine speed.

The generator frequency is in this case matched to the main machine speed via the gearing.

Conventional Shaft Generator (PTO)

This control system is used predominantly for marine vessels with variable-pitch propellers, since the shaft generator frequency is kept constant by switching the main machine to constant speed. The speed of the vessel is in this case regulated by varying the propeller blade pitch. Parallel operation between WG and DG is feasible only for load transfer or in an extremely calm sea.

WGA 23D

Switching on the WGA 23D

The WGA 23D can be switched on only when the on-board power supply system is available. Blackout starting, as in the case of DG is not possible. The WGA 23D is switched on from the PMA 71 control panel in the local semiautomatic mode. A number of preconditions have to be satisfied before the WGA 23D can be switched on.

The speed of the main machine is in the operating range

The coupling must be switched on

The WGA control is switched on

No fault message in the control system

If these preconditions are satisfied, then the WGA 23D passes the "READY TO START" signal to the PMA 71. The following message is displayed on the control panel:

| "START" | (BM) |
|---|---|

When the "START" key is operated the "PRESS TO CONFIRM" message is displayed on the control panel for an adjustable time. However, the command is not carried out unless the "CONFIRM" acceptance key is operated within this time. If this is not done, the request is rejected. A start command can be issued only when the "READY TO START" signal from the WGA 23D is present. If the "CONFIRM" key is operated within this time, then a start command is issued to the WGA 230 controller. The WGA 23D now starts the start-up process. The following message is displayed on the control panel:

| "OPERATION" | (BM) |
|---|---|

The generator voltage>85% signal results in the message "OPERATION" (BM) being displayed.

After completion of the start-up process (after approximately 60 seconds) the "ready for synchronization" and "enable generator switch" signals are passed from the WGA 23D to the PMA 71. The following messages are displayed on the control panel:

| "READY FOR SYNCHRONIZATION" | (BM) |
|---|---|
| "ENABLE GENERATOR SWITCH" | (BM) |

If the PMA 71 is switched to "automatic", the synchronization is started The paritetic load distribution is carried out once the generator switch has been switched on.

The currently active operating state and the real power being emitted from the generator are displayed on the control panel. The "ENABLE GENERATOR SWITCH" signal is wired directly to the main switch panel. The generator switch cannot be switched on without this signal. The WGA 23D can switch off the generator switch by canceling this signal (in the event of a serious fault).

Start Fault

If the "ENABLE GENERATOR SWITCH" signal does not arrive within a specific time after the start command has been issued, the following message appears on the control panel:

| "START FAULT" | (FM) |
|---|---|

Manually Switching Off the WG in the Parallel Mode

The WGA 23D can be stopped from the PMA 71 control panel in the local semiautomatic mode. When the "STOP" key is operated, the "PRESS TO CONFIRM" message is displayed on the control panel for an adjustable time. However, the command is not carried out unless the "CONFIRM" acceptance key is operated within this time. If this is not done, the request is rejected.

A stop command is passed to the WGA 23D controller. If the machine set is being operated in parallel on the power supply system, then a "STOP with load reduction" is carried out first.

The BM "LOAD RED" is displayed on the control panel. "LOWER" adjusting pulses are emitted in order to reduce the load on the machine set. The generator switch is switched off when the power falls below the "GEN. POWER MIN." limit value. Once the generator switch has been switched off, a "STOP" command is passed to the WGA 23D controller.

When the "STOP" command is output, the operation message on the control panel changes from "LOAD RED" to "MACHINE SET STOPPING".

Manually Switching Off the WG in the Insular Mode

If the WG is the only one connected to the power supply system, then switching it off would result in a blackout. A diesel set must therefore be started and synchronized before this is done. After synchronization of the DG, the rest of the process is as described previously.

Slow Down of Main Machine

The PMA 71 is supplied with this signal via a floating contact from the diesel remote control. In the event of a slow down, the speed of the main machine is maintained by the remote control for a certain time in order to start a standby machine set and to carry out a load transfer.

When this signal arrives, the PMA 71 is blocked and a standby machine set is started. The following message is displayed on the control panel:

"SLOW DOWN OF MAIN MACHINE"

After starting and synchronization of the standby machine set, the PMA 71 controller for the WGA 23D carries out a "stop with load reduction". "LOWER" adjusting pulses are emitted in order to reduce the load on the machine set. During the process of reducing the load, the BM "LOAD RED" is displayed on the control panel. When the power falls below the limit value "GEN. POWER MIN.", the generator switch is switched off.

When the generator switch is switched off, the PMA controller for the WGA 23D is switched to the "local semiautomatic mode". At the same time a "STOP" command is passed to the WGA 23D controller. When the "STOP" command is issued, the operation message changes from "LOAD RED" to "STOP".

When the generator switch is switched off, the remote control continues with the "slow down" of the main machine. A floating contact must be connected from the switch panel to the diesel remote control for this function (this is not a function of the PMA 71).

Shut Down of the Main Machine

The PMA 71 is supplied with this signal via a floating contact from the diesel remote control. In contrast to the "slow down of the main machine", the speed of the main machine is in this case not maintained for a specific time. The rate of change of speed of the main machine determines whether there is sufficient time to start a standby machine set, and to carry out a load transfer. Normally, a shut down of the main machine leads to a blackout.

The signal results in a start command being issued to the standby machine set, and in the WGA 23D controller being blocked. If the "start two generators in the event of a fault" function is selected, then two diesel sets are started.

The following message:

"EMERGENCY STOP OF MAIN MACHINE"

is displayed on the control panel.

After starting and synchronization of the standby machine set, the PMA 71 controller for the WGA 23D carries out a "stop with load reduction". "LOWER" adjusting pulses are emitted in order to reduce the load on the machine set. During the load-reduction process, the BM "LOAD RED" is displayed on the control panel. When the power falls below the "GEN. POWER MIN." limit value, the generator switch is switched off.

When the generator switch is switched off, the PMA controller for the WGA 23D switches to the "local semiautomatic mode". At the same time, a "STOP" command is passed to the WGA 23D controller. When the "STOP" command is issued, the operation message changes from "LOAD RED" to "STOP".

If the speed of the main machine falls below the operating range of the WGA 23D before the load transfer has taken place to the standby machine set, then the generator switch is switched off by the WGA 23D independently of the PMA 71. The standby machine set that has already started is then connected via "blackout".

Machine Telegraph (MT)<$n_{Min}$

The PMA 71 is supplied with this signal via a floating contact either via the diesel remote control or from the WGA 23D. The minimum speed for operation of the WGA 23D is normally 40% of the rated speed of the main machine. The minimum speed is, however, dependent on the design of the main machine and of the WGA 23D. If the MT lever is set below this limit, the diesel remote control stops the reduction in the speed at this point in order to allow a standby machine set to be started and a load transfer to be carried out.

If this signal occurs in the automatic mode when the generator switch is closed, a standby machine set is started. The following message is displayed on a control panel:

| "MT < N MIN" | (BM) |
|---|---|

After starting and synchronization of the standby machine set, the PMA 71 controller for the WGA 23D carries out a "STOP WITH LOAD REDUCTION". "LOWER" adjusting pulses are emitted in order to reduce the load on the machine set. During the load-reduction process, the BM "LOAD RED" is displayed on the control panel. When the power falls below the "GEN. POWER MIN." limit value, the generator switch is switched off.

Once the generator switch has been switched off, the diesel remote control continues to reduce the speed. A floating contact must be passed from the switch panel to the diesel remote control for this function (this is not a function of the PMA 71)

Machine Telegraph (MT)>$n_{Min}$

If the MT lever is once again set to a value above the minimum speed, the "STOP WITH LOAD REDUCTION" function is canceled. The BM "LOAD RED" which may already be displayed on the control panel is extinguished again. The machine set that has already been started is synchronized, and is stopped once again if the load is too low, or manually.

DG Request (Warning)

The PMA 71 is supplied with this signal via a floating contact from the WGA 23D. The signal is produced when the WGA 23D detects an overload. A standby machine set is started.

The following message is displayed on the control panel:

| "DG REQUEST FROM THE WG" | (BM). |
|---|---|

Load sharing is carried out after starting and synchronization of the standby machine set.

WG Delayed Stop

The PMA 71 is supplied with this signal via a floating contact from the WGA 23D. If the WGA 23D has identified a fault which still allows operation to continue for a short time, then the "WG DELAYED STOP" signal is passed to the PMA 71. Normally, this time is sufficient to start a standby machine set and to carry out a load transfer.

When this signal arrives, a delayed stop of the WGA 23D is carried out, together with blocking of the controller, and a standby machine set is started. The following message is displayed on the control panel:

"WG DELAYED STOP".

Once the standby machine set has been started and synchronized, the PMA 71 controller for the WGA 23D carries out a "stop with load reduction". "LOWER" adjusting pulses are emitted in order to reduce the load on the machine set. During the load-reduction process, the BM "LOAD RED" is displayed on the control panel. When the power falls below the "GEN. POWER MIN." limit value, the generator switch is switched off.

When the generator switch is switched off, the PMA controller for the WGA 23D is switched to the "local semiautomatic mode". At the same time a "STOP" command is passed to the WGA 23D controller. When the "STOP" command is output, the operation message changes from "LOAD RED" to "STOP".

WG Undelayed Stop

The PMA 71 is supplied with this signal via a floating contact from the WGA 23D.

If the WGA 23D has identified a critical fault which requires an immediate stop, then this signal is passed to the PMA 71. The WGA 23D is de-energized, and the generator switch is switched off. ("Enable generator switch" signal=Off). If the shaft generator is connected to the power supply on its own, then this signal causes a blackout.

When this signal occurs, an undelayed stop of the WGA 23D is carried out, the generator switch is switched off, the controller is blocked and a standby machine set is started. The following message is displayed on the control panel:

"WG UNDELAYED STOP".

If the PMA 71 was in the automatic mode, then it is switched to the local semiautomatic mode.

In the event of a blackout, the newly started standby machine set is connected after a short run-up time, or it is synchronized if another machine set perfume to the power supply system.

Reverse Power Protection for the WGA 23D

Reverse power protection for the shaft generator is not necessary, since the WGA 23D does not allow any reverse power flow. However, a small real power flow to the WGA 23D is required in order to operate the wattless component machine when the shaft generator is running on no load. In order to prevent the generator switch from being switched off, the reverse power protection for the shaft generator should be switched off, or the limit value should be set sufficiently high that it cannot be triggered.

Conventional WG (PTO)

The frequency of the shaft generator is dependent on the speed of the main machine. Any change in the speed (for example resulting from a heavy sea) also changes the frequency of the on-board power supply system. During parallel operation with a diesel generator, this leads to severe load shifts. For this reason, PMA 71 does not allow continuous parallel operation between SG and DG.

Switching on the WG when the on-Board Power Supply is Present

The function described here carries out a load transfer from a DG to a WG. The main machine is switched to constant speed by supplying one contact to the remote control for this purpose. When the contact is switched on, the remote control keeps the main machine at a constant speed. When the WG is switched on, the remote control receives the "WG ON" signal. However, the speed can now be reduced only if the WG has previously been switched off again and the "WG ON" signal has disappeared.

The following conditions must be satisfied in order to switch on the WG:

Generator voltage greater than 85%
READY TO SWITCH ON signal
The following BMs are displayed on the control panel
SEMI
READY TO SWITCH ON.
Switch to AUTOMATIC.

When the automatic mode is switched on, the WG controller passes adjusting pulses to the diesel set via the connection for common frequency adjustment, in order to match the frequency of the on-board power supply system to its own frequency (this works only when READY TO SWITCH ON is present). Synchronization is carried out as for a diesel set. After synchronization, the DG receives LOWER adjusting pulses from the WG controller and reduces the load on the DG.

During the load-reduction process, the BM LOAD RED is displayed on the control panel. Once the power falls below the "Gen. power minimum" limit value, the generator switch is switched off. The DG can still carry out a no-load run (depending on the configuration) and is then stopped. When the stop command is emitted, the BM LOAD RED is extinguished.

Switching Off the WG

The function described here carries out a load transfer from SG to a DG. In order to switch off the WG, a DG is started in the local semiautomatic mode. After switching to AUTOMATIC, the synchronization of the DG is started. After switching on the generator switch, a "stop with load reduction" is carried out for the WG. During the load reduction process, the BM "LOAD RED" is displayed on the ST.

The WG controller passes adjusting pulses to the diesel set via a connection between the PMA 71 systems. "High" adjusting pulses are passed to the DG until the load on the WG is reduced below the "Generator power minimum" limit value. The generator switch is then switched off. When the generator switch is switched off, the BM "LOAD RED" is extinguished, and the WG controller is switched to the local semiautomatic mode.

Slow Down of Main Machine

The PMA 71 is supplied with this signal via a floating contact from the diesel remote control. In the case of a slow down, the speed of the main machine is maintained by the remote control for a certain time in order to start a standby machine set and to carry out a load transfer.

When this signal occurs, a delayed stop of the WG, blocking of the controller and starting of a standby machine set are carried out. The following message is displayed on the control panel:

| "SLOW DOWN OF MAIN MACHINE" | (SM). |
| --- | --- |

After the DG has been started and synchronized a "Stop with load reduction" is carried out for the WG.

During the load-reduction process, the BM "LOAD RED" is displayed on the ST. The WG controller passes adjusting pulses to the diesel set via a connection between the PMA 71 systems. "Higher" adjusting pulses are passed to the DG until the WG load has been reduced below the "Generator breaker minimum power" limit value. The generator switch is then switched off.

When the generator switch is switched off, the BM "LOAD RED" is extinguished, and the BM "BLOCKED" is displayed. The WG controller is switched to the local semiautomatic mode.

After switching off the generator switch, the remote control continues the slow down of the main machine. A floating contact must be passed from the switch panel to the diesel remote control for this function (that is not the function of the PMA 71).

Emergency Stop of Main Machine, Delayed/Undelayed Step of the WG

The PMA 71 is supplied with this signal via a floating contact from the diesel remote control. In contrast to the "Slow down of main machine", the speed of the main machine is in this case not maintained for a specific time. The rate of change of speed of the main machine determines whether there is sufficient time to start a standby machine set, and to carry out a load transfer.

The signal results in a start command being passed to the standby machine set, and the WGA 23D controller being blocked. If the function "start two generators in the event of a fault" is selected, then two diesel sets are started. The following message is displayed on the control panel:

"EMERGENCY STOP OF MAIN MACHINE".

Once the DG has been started and synchronized, a "Stop with load reduction" is carried out for the WG.

During the load-reduction process, the BM "LOAD RED" is displayed on the control panel. The WG controller passes adjusting pulses to the diesel set via a connection between the PMA 71 systems. "Higher" adjusting pulses are passed to the DG until the load on the WG has been reduced below the "Generator breaker minimum power" limit value. The generator switch is then switched off.

When the generator switch is switched off, the BM "LOAD RED" is extinguished, and the BM "BLOCKED" is displayed. The WG controller is switched to the local semiautomatic mode.

If the speed is already below the operating range of the WG (Generator switch trips due to undervoltage or underfrequency), the standby machine set which has already been started is connected via "blackout".

Reverse Power

While the load is being accepted or transferred, the DG can change to reverse power mode due to severe speed fluctuations in the main machine (because of the marine vessel's propeller surfacing due to the wave height, etc.). Reverse power evaluation of the DG is therefore inhibited during this time. Reverse power evaluation is generally inhibited for the WG, since it always runs on its own.

On-Board Power Supply System Monitoring

The on-board power supply system monitoring has the following tasks:

Start of a standby machine set in the event of a blackout, in order to supply the loads with electrical power as quickly as possible once again, Protection of the on-board power supply system against unacceptable frequency errors (underfrequency), by switching off unimportant loads, Protection of the on-board power supply system against unacceptable frequency disturbances (underfrequency/overfrequency) by switching off the generator switch. If there is a major difference between the busbar frequency and the rated frequency, synchronization is often impossible, because the rated frequency is outside the adjustment range of the speed adjustment device. Switching is therefore carried out via "blackout".

Protection of the on-board power supply system against unacceptable voltage discrepancies (undervoltage/overvoltage) by switching off the generator switch. In this case, no paralleling is carried out, since the different magnitudes of the voltage that is set on the busbar and the voltage that is set on the generator that is to be connected would result in a high reactive current flowing. For this reason, switching takes place via a "blackout".

Blackout

Busbar monitoring (for example two auxiliary contactors) must be provided by the switch panel manufacturer. These auxiliary contactors can be connected between the phases L1–L2, L2–L3 via a circuit breaker. Each relay requires two auxiliary contacts (1M, 1B), and the circuit breaker requires one auxiliary contact (1B). These auxiliary contacts must be connected such that two signals are provided for the PMA 71.

a) Blackout signal (all auxiliary contactors tripped, B, circuit breaker, M)

b) "Busbar voltage present" signal (all auxiliary contactors connected, M)

This circuit ensures that no blackout is identified as a result of the disconnection of the circuit breaker or as a result of the failure of one of two phases. The following message is displayed on the control panel:

| "BUSBAR MONITORING FAULT" | (SM) |
| --- | --- |

The busbar monitoring must be provided separately for each PMA 71. The auxiliary relay contacts are connected to the corresponding connections of the PMA 71.

If "BLACKOUT" is identified, then the next available machine set is started, and is switched on following a short delay time after the generator voltage reaches>85%. Simultaneous connection of the generator switches for two or more machine sets which are started at the same time to the non-live busbar is prevented by way of a simultaneous inhibit Underfrequency/Overfrequency Automatic Mode The frequency of the on-board power supply system is detected via the generator protection device/measurement transducer, and is monitored in the SIMATIC-S7. The limit values and delay times for underfrequency/overfrequency can be changed from the control panel. The function is password-protected.

The following messages are output if the respective limit values are undershot or exceeded:

"Overfrequency"
"Underfrequency 1"
"Underfrequency 2"
"Underfrequency 3"

The initiated functions are listed in the "GENERATOR PROTECTION" table.

Local Semiautomatic Mode

If a machine set is being used in the manual mode and an underfrequency or overfrequency is identified, then the messages which are produced are as described above, although no machine set is added.

Undervoltage/Overvoltage

Automatic Mode

The frequency of the on-board power supply system is detected via the generator protection device/measurement transducer, and is monitored in the SIMATIC-S7. The limit values and delay times for underfrequency/overfrequency can be changed from the control panel. The function is password-protected.

The following messages are output if the respective limit values are undershot or exceeded:

"Overvoltage"
"Undervoltage 1"
"Undervoltage 2"
"Undervoltage 3"

The initiated functions are listed in the "GENERATOR PROTECTION" table in Section 7.

Local Semiautomatic Mode

If a machine set is being used in the manual mode and an underfrequency or overfrequency is identified, then the messages which are produced are as described above, although no machine set is added.

Generator Protection

The generator protection has the following tasks:

Protection of the generator and of the on-board power supply system against the consequences of a short circuit, by disconnection of the generator switches for the generators which feed the on-board power supply system. In this case, the disconnection normally takes place with a short time delay, in order to provide time for lower-level circuit breakers to be disconnected (selectivity).

Short-circuit counting, stopping and blocking of the machine set and switching of the other machine sets to manual operation, in order to prevent automatic connection of a standby generator to the busbar.

If appropriate, allowing standby start and connection of the generator to the busbar (thus, a second short circuit if the short circuit has not been rectified in the meantime).

Protection of the generator against overloading due to disconnection of the generator switch when an overcurrent is flowing.

Protection of the generator against overloading due to disconnection of unimportant loads when overcurrent is flowing, overloading.

Disconnection of the generator switch in the event of reverse power.

In addition, undelayed short-circuit tripping for very large short-circuit currents, or differential protection, is also required. These functions are not included in the PMA 71 but need to be provided separately in the switchgear assembly.

Short Circuit

The generator currents are monitored for short circuits by the generator protection apparatus/measurement transducer GENOP 71. If a short circuit occurs, the output relay for the generator switch is operated. In order to achieve selectivity between the generator switch and the lower-level circuit breakers, the generator switch is normally switched off with a delay.

The limit value and the delay time can be set via the control panel. The function is password-protected.

A stock command is emitted to the relevant diesel engine (or to the shaft generator controller). The following messages are displayed on the control panel:

| | |
|---|---|
| "GENERATOR SHORT CIRCUIT" | (SM) |
| "BLOCKED" | (BM) |

The following message is displayed on the control panel of the other machine set:

"OTHER MACHINE SET SHORT CIRCUIT" (SM)

It is possible to select whether one or two short circuits is or are allowed.

If only one short circuit is allowed, all the other machine sets are switched to "semiautomatic" after just one short circuit. The other machine sets do not start.

If two short circuits are allowed, one standby machine set is started and connected to the power supply system after the first short circuit. If a second short circuit occurs, this machine set is also stopped and blocked and all the other machine sets are switched to "semiautomatic". This prevents a third machine set from being started and connected.

The off command for the generator switch is provided directly from the generator protection device/measurement transducer, and still operates even in the event of failure of the PLC or of the 24V DC supply voltage (for supplying the generator protection device from the generator voltage). The other functions are carried out in the PLC.

Short-Circuit Acknowledgement

The short-circuit storage for that particular machine set must be acknowledged manually. Once the stop command has disappeared, the blocking of the machine set can be canceled.

Overcurrent

The three generator currents $I_{L1}/I_{L2}/I_{L3}$ are monitored in the generator protection device/measurement transducer for exceeding various limit values. If at least one of the currents exceeds the limit value, unimportant loads and/or the generator switches are disconnected once the delay time has elapsed. The limit values and delay times can be varied via the control panel. The function is password-protected.

The following signals are emitted:
Disconnection of unimportant loads, level 1
Disconnection of unimportant loads, level 2
Disconnection of unimportant loads, level 3
Disconnection of generator switches
Machine set stop command
Block machine set
Switching to semiautomatic The association between the individual functions and the limit values as well as the standard settings are shown in Table 7.8.

Depending on the function that is initiated, the following messages are displayed on the control panel:

| | |
|---|---|
| "DISCONNECTION OF UNIMPORTANT LOADS 1" | (SM) or |
| "DISCONNECTION OF UNIMPORTANT LOADS 2" | (SM) or |
| "DISCONNECTION OF UNIMPORTANT LOADS 3" | (SM) or |
| "OVERCURRENT, STANDBY START" | (SM) |
| "BLOCKED" | (BM) |
| "SEMI" | (BM) |
| "Generator switch case" | (SM) |

The off command for the generator switch and for the unimportant loads comes directly from the generator protection device/measurement transducer, and still works even in the event of failure of the PLC or of the 24V DC supply voltage (the supply for the generator protection device from the generator voltage). The other functions are carried out in the PLC.

Overload

The emitted power from the generator is detected in the GENOP 71 generator protection device, and is monitored in the Simatic-S7. The limit values for overloading can be varied from the control panel. The function is password-protected.

The following signals are emitted:
Disconnection of unimportant loads, level 1
Disconnection of unimportant loads, level 2
Disconnection of unimportant loads, level 3
Disconnection of generator switches
Machine set stop command
Block machine set
Switching to semiautomatic The association between the individual functions and the limit values as well as the standard settings are shown in Table 7.8.

Depending on the function that is initiated, the following messages are displayed on the control panel:

| | |
|---|---|
| "DISCONNECTION OF UNIMPORTANT LOADS 1" | (SM) or |
| "DISCONNECTION OF UNIMPORTANT LOADS 2" | (SM) or |
| "DISCONNECTION OF UNIMPORTANT LOADS 3" | (SM) or |
| "OVERCURRENT, STANDBY START" | (SM) |
| "BLOCKED" | (BM) |
| "SEMI" | (BM) |
| "Generator switch case" | (SM) |

The off command for the generator switch and for the unimportant loads comes directly from the generator protection device/measurement transducer, and still works even in the event of failure of the PLC or of the 24V DC supply voltage (the supply for the generator protection device from the generator voltage). The other functions are carried out in the PLC.

Monitoring of the Current Transformers

The current transformers are monitored when the generator switch is switched on. This is done by comparing the mean value with the extreme value. The following states result in a fault message:
Extreme value (greatest value of the three generator currents ($I_{L1}/I_{L2}/I_{L3}$) less than the mean value
Mean value less than 75% of the extreme value When a fault occurs, the following message is displayed on the control panel:

| | |
|---|---|
| "FAULT IN CURRENT MEASUREMENT" | (SM) |

This monitoring presupposes that the single-phase onboard power supply system loads are shared in a largely balanced manner. This makes it possible to identify faults in the current transformer and a wire discontinuity in the current transformer circuit.

The function can be switched off via the control panel.

Reverse Power

The real power is monitored in the generator protection device/measurement transducer. If the reverse power limit value is exceeded, the generator switch is disconnected once a delay time has elapsed. The limit value and the delay time can be varied via the control panel. The function is password-protected.

The following signals are emitted:
Disconnection of generator switches
Machine set stop command
Block machine set
Switch to local semiautomatic mode
Request standby machine set The following messages are displayed on the control panel:

| | |
|---|---|
| "REVERSE POWER" | (SM) |
| "BLOCKED" | (BM) |

The limit value and the delay time can be varied via the control panel. The function is password-protected. The standard settings are shown in Table 7.8.

The off command for the generator switch comes directly from the generator protection device/measurement transducer, and still operates even in the event of failure of the PLC or of the 24V DC supply voltage. The other functions are carried out in the PLC.

External Generator Protection

Some of the generator protection functions described above are already integrated in the generator switch, or in the switch panel. In order to avoid duplicated tripping with virtually the same limit values from two different gradients, the relevant limit values in the PMA could in this case be set sufficiently high that tripping is carried out only by the generator protection in the switch panel. The other functions (standby start, fault signaling, etc.) which are carried out by the PMA are not used in this situation.

Generator Switch with Built-in Short-Circuit Release (Option)

If a generator switch is used which has its own short-circuit tripping, then an auxiliary contact of the generator switch is required in order to form the short-circuit counting chain (contact open when there is a short circuit). The short-circuit detection in the generator protection device/measurement transducer should then sensibly be rendered inoperative.

Undelayed Short-Circuit Tripping (Option)

Some classes require undelayed tripping of the generator switch in response to particularly large short-circuit currents. An appropriate tripping device must be provided in the generator switch for this purpose.

The tripping point is greater than the short-circuit current of a single machine set. Tripping can take place only when the short-circuit is located between the generator and the generator switch or in the generator itself, and two or more generators which are operated in parallel with the faulty machine set can feed the short-circuit point.

In the PMA, one digital input is provided for connection of a signaling contact for the undelayed short-circuit release (tripping=contact closed). When tripping takes place, the following signals are emitted from the PMA:
Disconnection of generator switches
Machine set stop command
Block machine set
Switching to manual
Connection command to the next machine set The following messages are displayed on the control panel:

| | |
|---|---|
| "UNDELAYED SHORT-CIRCUIT TRIPPING" | (SM) |
| "BLOCKED" | (BM) |
| "SEMI" | (BM) |

Differential Protection (Option)

Beyond a certain generator power level, some classes require differential protection. An external differential protection monitoring device must be provided for this purpose.

One digital input of the PMA is provided for connection of a signaling contact of the external differential protection monitoring device (tripping=contact closed). When tripping takes place, the PMA emits the following signals:
Disconnection of generator switches
Machine set stop command
Block machine set
Switching to local semiautomatic mode
Connection command to the next machine set The following messages are displayed on the control panel:

| | |
|---|---|
| "DIFFERENTIAL PROTECTION TRIPPED" | (SM) |
| "BLOCKED" | (BM) |
| "SEMI" | (BM) |

7.9 Table of the generator protection functions (Table 7.8)

| LIMIT VALUE | TIME VALUE IN % s | STANDBY MACHINE SET REQUEST | DISCONNECTION OF UNWANTED LOAD 1 | DISCONNECTION OF UNWANTED LOAD 2 | DISCONNECTION OF UNWANTED LOAD 3 | DISCONNECTION OF GENERATOR SWITCHES | BLOCK MACHINE SET | MOTOR STOP | SWITCHING Auto → Semi |
|---|---|---|---|---|---|---|---|---|---|
| GENERATOR CURRENT | | | | | | | | | |
| 1 | 95 30 | X | | | | | | | |
| 2 | 100 5 | X | | | | | | | |
| 3 | 100 5 | | X(1) | | | | | | |

-continued 7.9 Table of the generator protection functions (Table 7.8)

| LIMIT VALUE | IN % | TIME VALUE s | STANDBY MACHINE SET REQUEST | DISCONNECTION OF UNWANTED LOAD 1 | DISCONNECTION OF UNWANTED LOAD 2 | DISCONNECTION OF UNWANTED LOAD 3 | DISCONNECTION OF GENERATOR SWITCHES | BLOCK MACHINE SET | MOTOR STOP | SWITCHING Auto → Semi |
|---|---|---|---|---|---|---|---|---|---|---|
| 4 | 100 | 10 | | | X(1) | | | | | |
| 5 | 100 | 15 | | | | X(1) | | | | |
| 6 | 120 | 1 | X | X(1) | X(1) | X(1) | | | | |
| 7 | 110 | 30 | | | | | X(1) | X | X | X |
| GENERATOR POWER | | | | | | | | | | |
| 1 | 95 | 30 | X | | | | | | | |
| 2 | 100 | 5 | X | | | | | | | |
| 3 | 100 | 5 | | X | | | | | | |
| 4 | 100 | 10 | | | X | | | | | |
| 5 | 100 | 15 | | | | X | | | | |
| 6 | 110 | 1 | X | X | X | X | | | | |
| 7 | −10 | 6 | | | | | X(1) | X | X | X |
| BUSBAR FREQUENCY | | | | | | | | | | |
| 1 | 97.5 | 60 | X | | | | | | | |
| 2 | 95 | 8 | X(3)(4) | | | | | | | |
| 3 | 95 | 6 | | X | | | | | | |
| 4 | 95 | 10 | | | X | | | | | |
| 5 | 95 | 15 | | | | X | | | | |
| 6 | 90 | 1 | X(3) | X | X | X | | | | |
| 7 | 90 | 15 | | | | | X | X | X | X |
| 8 | 105 | 2 | | | | | | | | |
| GENERATOR VOLTAGE | | | | | | | | | | |
| 1 | 90 | 5 | X(3) (4) | | | | | | | |
| 2 | 60 | 1 | | | | | X | X | X | X |
| 3 | 105 | 5 | X(3)(4) | | | | | | | |
| 4 | 110 | 5 | X(2) | | | | | | | |

(1) Function provided in the GENOP 71 (independently of the S7-300 PLC)
(2) In addition, the generator is switched off
(3) Switching takes place via blackout, once the newly started machine set is ready to be connected.

Power Management

The power management has the following tasks:

Starting a standby machine set in the event of overcurrent, overload, underfrequency Definition of the starting sequence of the standby machine set Selection of a minimum number of generators (option)

Time-delayed disconnection of generators which are not required (underload)

Definition of disconnection sequence for the unrequired generators

Control of the busbar frequency (constant frequency or with voltage droop)

Real load distribution between the generators (proportional to the ratings or nonuniform load distribution)

Reactive load distribution (option)

Connection Chain

The connection chain is used to preselect which machine set will be the next to be started in the event of a request from the PMA 71 (overload, overcurrent etc.). This function may be carried out from any control panel.

The "START/STOP SEQUENCE" submenu is displayed by pressing "ENTER" twice and ↓ once on the control panel, as follows:

| START/STOP | SEQUENCE | INPUT | |
|---|---|---|---|
| 1. GEN.: | 1/3 : 1 | ——— | Transfer number with "ENTER" |
| 2. GEN.: | 2/4 : 2 | | |
| 3. GEN.: | 4/2 : 4 | | |
| 4. GEN.: | 3/1 : 3 | | |
| . | . | | |
| . | . | | |
| 13. GEN.: | 0/0 : 0 | | |
| Cnfrm: | 1 | ——— | Transfer new Start/Stop sequence using "ENTER" |

The new start sequence is entered in the "INPUT" column. Each input must be confirmed using "ENTER". The ↓↑ keys are used to jump from line to line.

The new sequence is accepted by entering a "1" in the "Cnfrm" line, and then by pressing "ENTER". The new start/stop sequence is now shown in the "Start/Stop" column. Double inputs and incorrect inputs are rejected by the error message:

"NOT POSSIBLE TO CHANGE THE START/STOP SEQUENCE"

Stop as a Result of Underloading

Preconditions:

Automatic mode

Function is enabled

Machine set is not running in the "UBL mode"

General

A machine set is stopped in the event of underloading. This is done by comparing the generator real power with a limit value. There are three different limit values for parallel operation of 2, 3 and 4 or more machine sets. The limit values must be set such that the remaining load does not lead to a repeated request for a standby machine set.

Disconnection Sequence

The disconnection sequence is the opposite of the connection sequence. The connection sequence is preselected on the control panel (see connection chain). If a machine set is not ready to be disconnected on the basis of the disconnection sequence, for example because it is not ready or is not in the automatic mode, then the next in the sequence is disconnected.

If the start sequence is 1>2>3, then the stopping sequence is 3>2>1. The machine set that is the next to be stopped in the event of underloading is indicated as the "NEXT STOP" in the control panel.

Disconnection Process

In the event of underloading, the following message is output on the control panel after an adjustable delay time (standard time 30 seconds).

UNDERLOADING

A "Stop with load reduction" is carried out after an adjustable delay time of 10 minutes (standard) and the machine set is stopped. The following message appears on the control panel:

UNDERLOADING, MACHINE SET BEING STOPPED"

Once the stopping time has elapsed, the machine set is available once again.

Block Disconnection Chain

The stop as the result of underloading function can be blocked from the control panel. The following text is displayed in the second submenu:

The "ENABLE STOP SEQUENCE" submenu is displayed as follows by pressing "ENTER" twice on the control panel:

| ENABLE DISCONNECTION CHAIN | |
|---|---|
| DISCONNECTION CHAIN | Active |
| ACTIVE/DEACTIVE | 1 |

The disconnection chain is enabled or inhibited by entering "1" or "0" as well as "ENTER". If the disconnection chain is inhibited, then all the machine sets which are connected to the power supply system remain connected to it, even if underloading occurs in the on-board power supply system.

Standby Start as a Result of Overcurrent

The actual value of the three generator currents $I_{L1}/I_{L2}/I_{L3}$ is passed from the generator protection device/measurement transducer to the PLC where the currents are monitored to determine whether they exceed three different limit values. If at least one of the currents exceeds a limit value, a standby machine set is requested once a delay time has elapsed. The limit values and times are staggered such that the limit value being exceeded to a minor extent results in a slow reaction, while the limit value being exceeded to a major extent results in a fast reaction.

The following message is displayed on the control panel:

| "STANDBY-START" | (SM) or |
|---|---|

The limit values and delay times can be changed via the control panel. The function is password-protected. The association between the individual functions and the limit values as well as the standard settings are shown in Table 7.8.

Standby Start as a Result of Overload

The actual value of the generator real power is passed from the generator protection device/measurement transducer to the PLC where the real power is monitored to determine whether it exceeds three different limit values. If a limit value is exceeded, a standby machine set is requested after a delay time has elapsed. The limit values and times are staggered such that the limit value being exceeded to a minor extent results in a slow reaction, while the limit value being exceeded to a major extent results in a fast reaction.

The following message is displayed on the control panel: "STANDBY-START" (SM) or The limit values and delay times can be changed via the control panel. The function is password-protected. The association between the individual functions and the limit values as well as the standard settings are shown in Table 7.8.

Standby Start as a Result of Underfrequency

The actual value of the power supply system frequency is passed from the generator protection device/measurement transducer to the PLC where the power supply system frequency is monitored to determine whether it exceeds three different limit values. If a limit value is exceeded, a standby machine set is requested after a delay time has elapsed. The limit values and times are staggered such that the limit value being exceeded to a minor extent results in a slow reaction, while the limit value being exceeded to a major extent results in a fast reaction.

However, the standby machine set is synchronized only for the first limit value (very minor discrepancy). In the other two cases, a standby machine set which has been run up is switched via "blackout". (This function is explained in Section "Underfrequency/overfrequency").

The following message is displayed on the control panel: "STANDBY-START" (SM) or The limit values and delay times can be changed via the control panel. The function is password-protected. The association between the individual functions and the limit values as well as the standard settings are shown in Table 7.8.

Real Load and Frequency Regulation

The signals from the frequency regulator and from the real power regulator are both passed to assessment stages. The outputs of the assessment stages are passed to a stepping regulator, which produces "higher" or "lower" pulses for the machine set speed regulator.

The load regulator factor is higher than the frequency regulator factor, so that the influence of the real power regulator is greater than that of the frequency regulator. Thus, load distribution is first of all carried out between the machine sets, and the frequency is regulated at the appropriate nominal value only after this has been done.

Real Load Regulation

Two different operating modes are possible:

Paritetic load distribution

Unbalanced load

Paretetic Load Distribution

In this operating mode, each generator produces power on the basis of its rated values.

Power

UBL mode

In this operating mode, a generator accepts as much load as possible (UBL max.) but not more than a selected maximum value. The other machine set accepts as little load as possible, but not less than a selected minimum value (UBL min.). The minimum value has a higher priority than the maximum value.

Frequency Regulation

Two different operating modes are possible:

Constant frequency regulation

Frequency regulation with frequency droop

Constant Frequency Regulation

In this operating mode, the power supply system frequency is regulated such that it is constant at the rated frequency.

Frequency Regulation with Droop

In this operating mode, the power supply system frequency is regulated in accordance with a curve. The curve is based on the generator power. The nominal values are in general selected such that the rated frequency (60 or 50 Hz) is achieved at 70 . . . 80% power. The no-load frequency is about 2 Hz higher.

Figure 3:
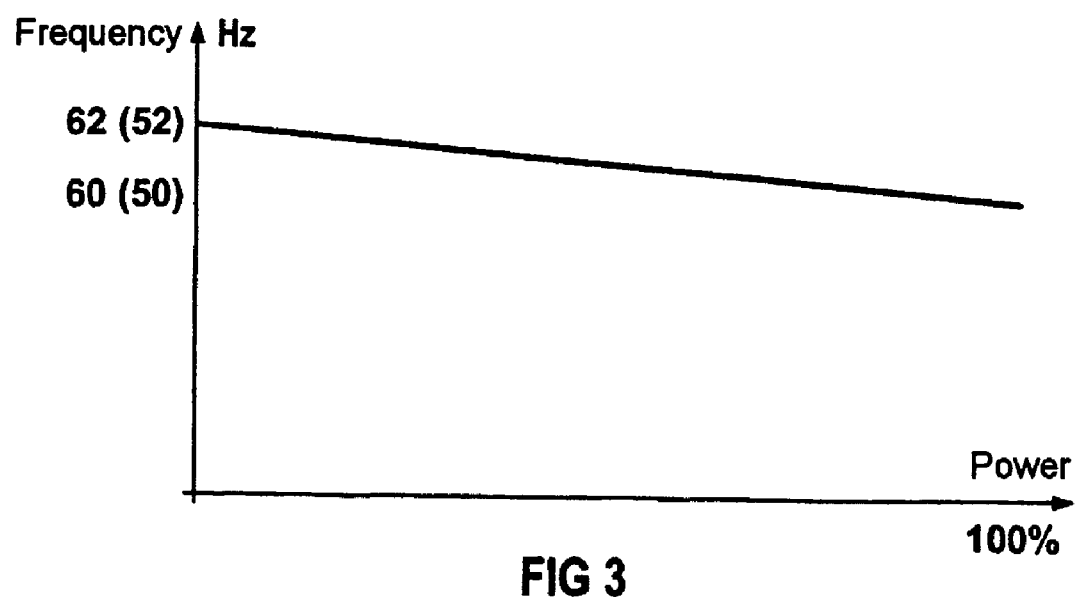
FIG. 3 illustrates a profile of the power supply system frequency in response to load changes in the power supply system (frequency regulation with droop)

The profile of the power supply system frequency in response to load changes in the power supply system (frequency regulation with droop) is shown in FIG. 3.

Generator Switch Monitoring

Generator Switch "ON" Monitoring

The "On" acknowledgement from the generator switch is monitored. If the acknowledgement does not appear within a variable time after the "ON" command, then the SM

"GENERATOR SWITCH ON ACKNOWLEDGEMENT FAULTY"

is output.

Generator switch "OFF" monitoring

The "Off" acknowledgement from the generator switch is monitored. If the acknowledgement does not appear within a variable time after the "Off" command, then the SM

"GENERATOR SWITCH OFF ACKNOWLEDGEMENT FAULTY"

is output.

Generator Switch "ON/OFF" Monitoring

The "On" acknowledgements and the "Off" acknowledgements from the generator switch are monitored for plausibility. If neither acknowledgement appears or both are present, then, after a variable time, the SM

"GENERATOR SWITCH ON/OFF ACKNOWLEDGEMENT FAULTY"

is output.

Second Connection Command

In certain on-board power supply system conditions, it may be worthwhile connecting two new machine sets in the event of a fault. This can be selected in the event of:

Blackout

Shutdown of one machine set

In this situation, the faulty machine set outputs two connection commands.

If one of the machine sets that is to be connected has a start fault, a further connection command is output to a third machine set, if there is one.

Generator Protection and Synchronization Device GENOP 71

The generator protection and synchronization device GENOP 71 provides the generator protection, with the following functions:

Short-circuit detection

Monitoring for overcurrent in each phase

Monitoring for reverse power

Disconnection of unimportant loads

Automatic synchronization of the generator to the busbar

Figure 4:
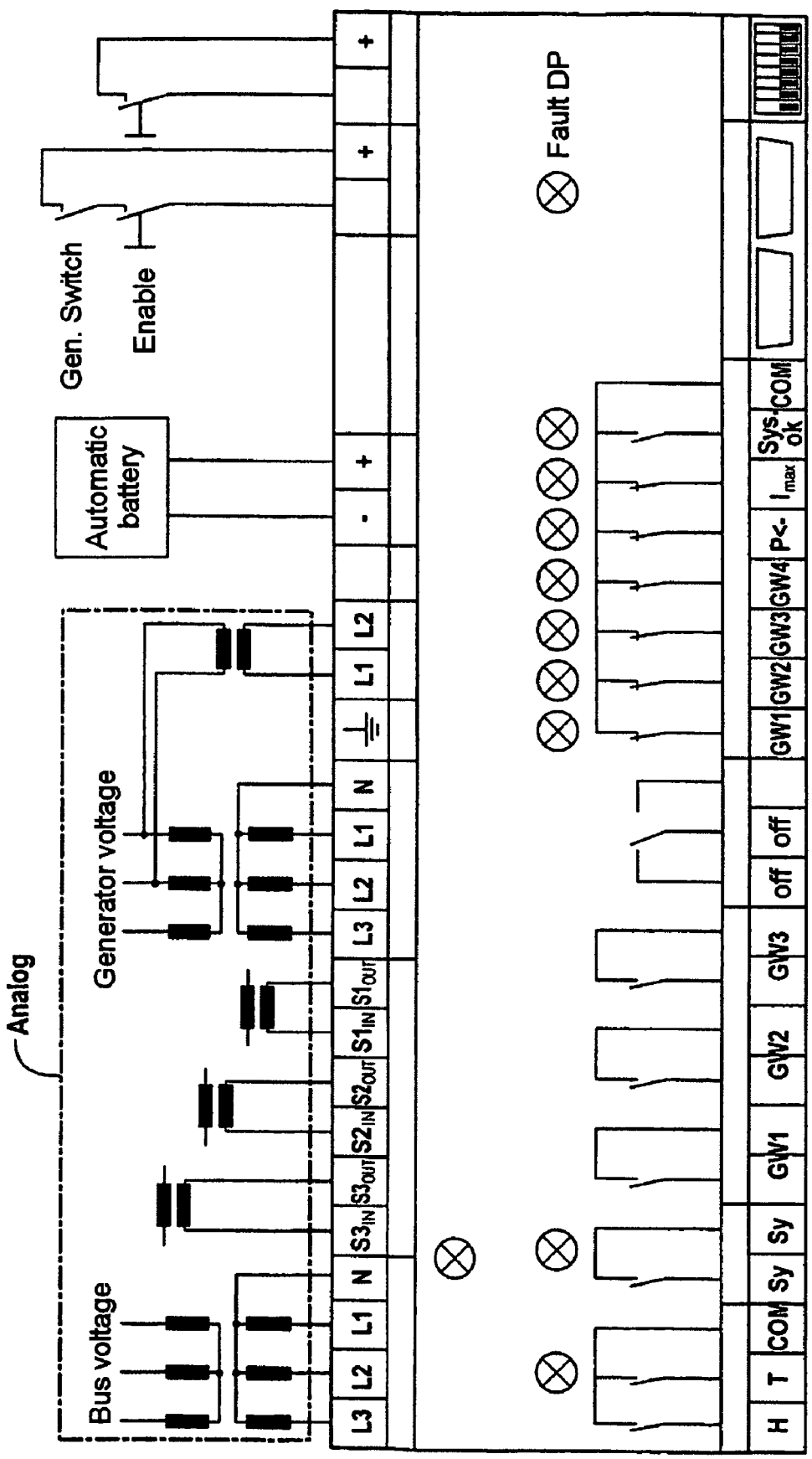
FIG. 4 illustrates the GENOP 71 connections.
Figure 5:
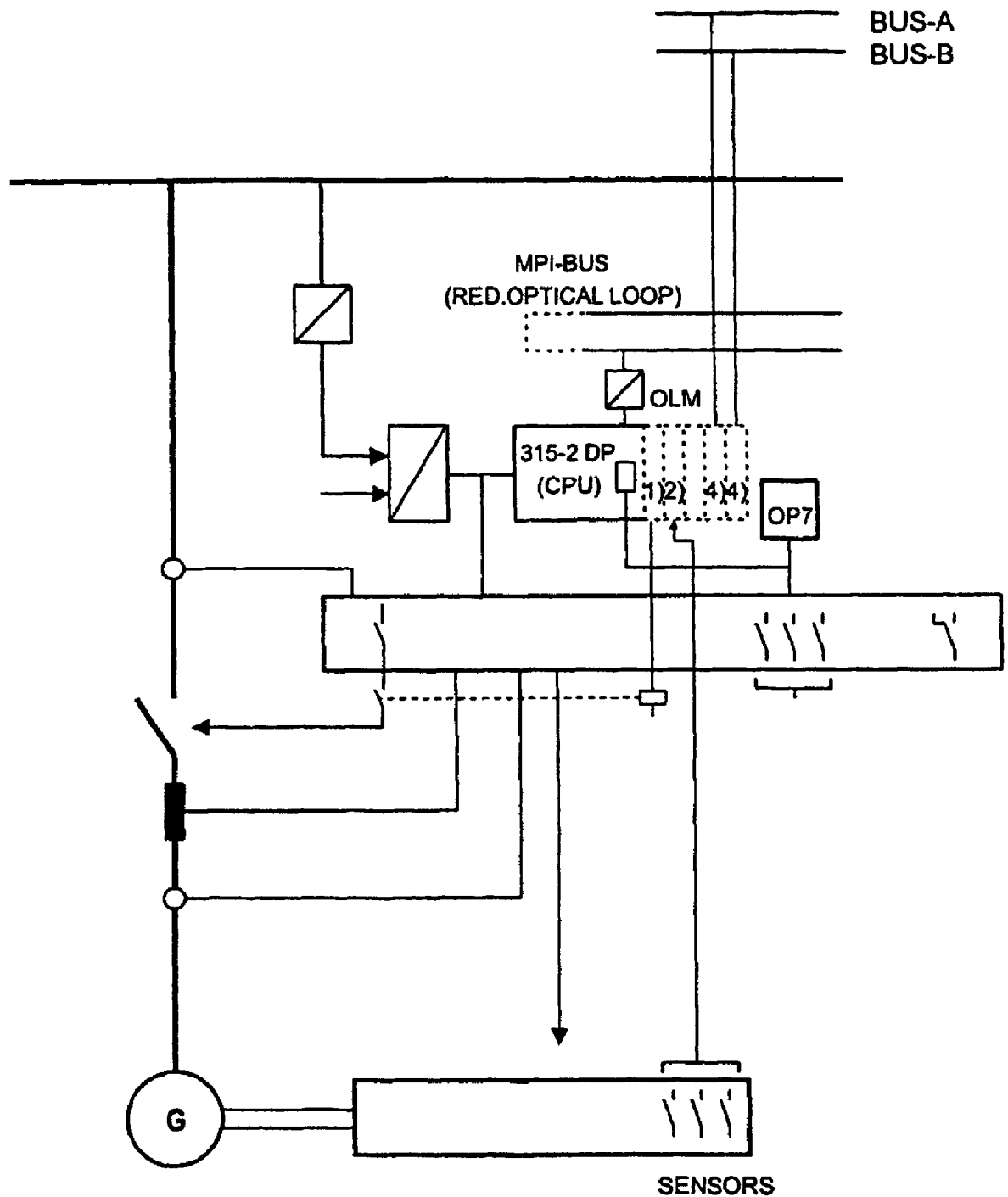
FIG. 5 illustrates the Genop 71 integrated in the PMA 71 system.

Detection, processing and transfer of different measurement values via the Profibus FIG. 4 shows the GENOP 71 connections. Genop integrated in the PMA 71 system. FIG. 5 shows the Genop 71 integrated in the PMA 71 system. The Genop and the Simatic-S7 communicate via the Profibus DP. The parameters for synchronization and generator protection can be changed via the control panel OP7.

See Section 13 for more information about control.

Genop 71 as an Individual Device

Figure 6:
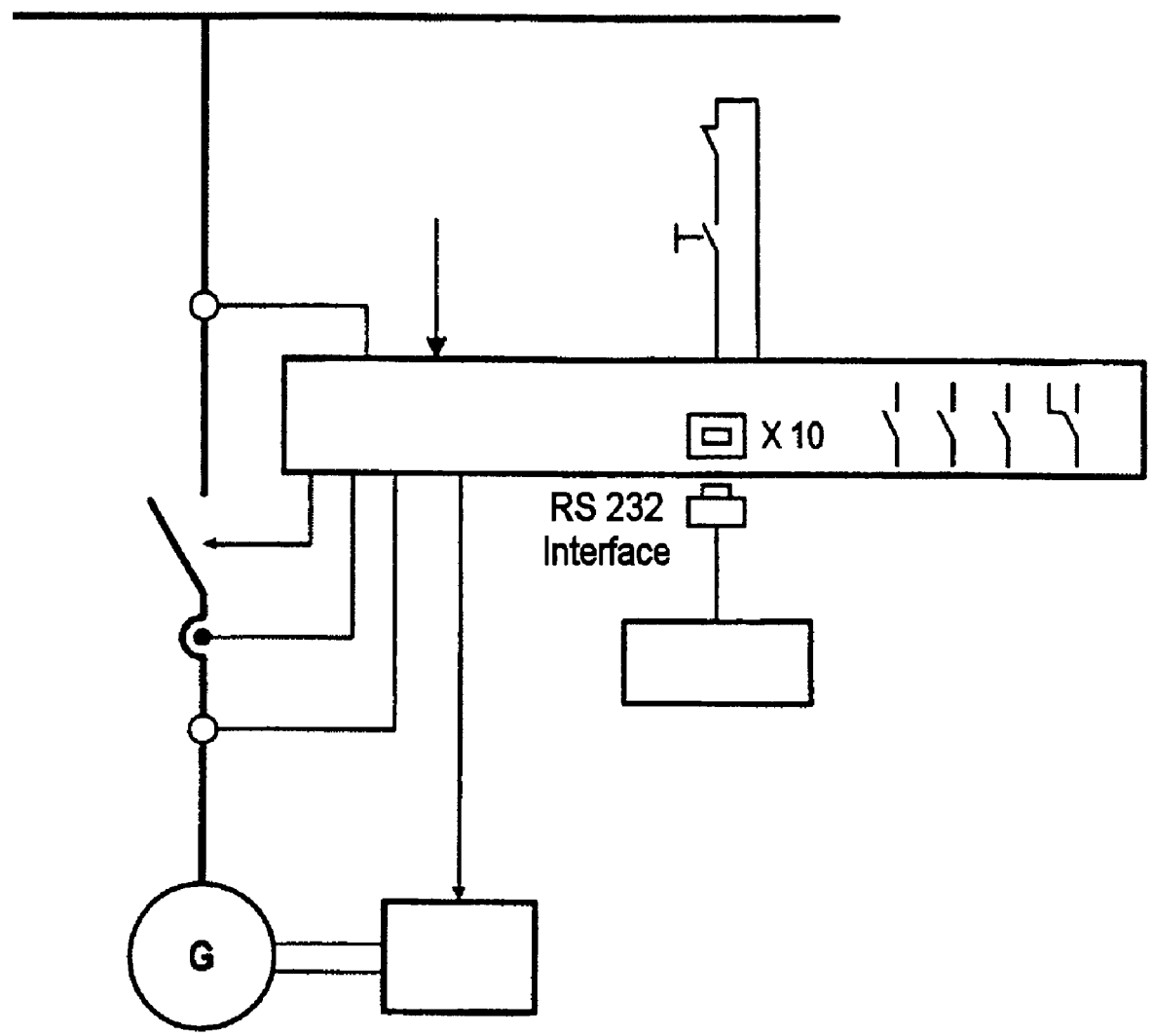
FIG. 6 illustrates the Genop 71 used as an individual device.

The Genop 71 may also be used as an individual device, as is shown in FIG. 6. The parameters for synchronization and generator protection can be changed via a serial interface (RS 232).

Test of the Device

The device should be tested once a year for correct operation. If the generator controller is designed in accordance with the standard circuit diagrams, then there will be a test set for testing the generator protection.

The cable from the test set is plugged into the test plug. A lamp for each phase now illuminates on the test set. There is a fuse behind each of the lamps, providing protection for the test set.

A current of 1 A or 5 A can be preselected on the secondary side in each phase, and can be set on the rotary knob. The instrument is also switched in this process. The current can be read on the appropriate scale. The direction of the current is set on a second switch. In the "Normal" position, the current direction is simulated from the generator to the power supply system, and in the "Reverse" position, the current direction is simulated from the power supply system to the generator. The ammeter in the switchgear assembly also operates in this case when the changeover switch ammeter is switched to the correct position.

The tripping point for shedding the unimportant loads and for disconnection of the switch as a result of overcurrent can now be approached for each phase by increasing the current in each phase. When checking the power settings, care must be taken to ensure that the currents are increased uniformly in the individual phases, in order to avoid spurious tripping as a result of one current possibly having been set too high.

Configuration Via a PC

If the Genop is in the form of a single device, then the settings can be made by way of a PC. The connecting cable to the PC is plugged to the serial interface. The configuration program is started by clicking the mouse on the "Genop 71" icon. The standard menu is displayed.

Load

The stored setup of a Genop can be loaded in the configuration program. The loading process does not automatically result in the parameters being transferred to the Genop 71.

Save

Stores the currently edited data from the configuration program. If the data has not yet previously been stored, then a file name is asked for first of all. The extension is always "Gen".

Save as

This allows a path and file name to be entered before storing a parameter record.

Transmit Data

Transmits all the parameter values set in the configuration program to the Genop 71.

Receive Data

Loads all the parameters that are currently in the Genop 71 into the configuration program.

Print

All the values contained in the configuration program are printed.

Exit

Ends after checking the configuration program.

Edit

| Limit values + Delay times | |
|---|---|
| Parameter | Meaning |
| Current 1 | Generator current limit value: if the limit value is exceeded, the unimportant loads are disconnected with a time delay in stages, stages 1–3 |
| Current 2 | Generator current limit value: (Not used) |
| Current 3 | Generator current limit value: if the limit value is exceeded, the unimportant loads are disconnected with a short time delay (1 s), stages 1–3 |
| Current 4 | Generator current limit value: if the limit value is exceeded, the generator switch is disconnected with a time delay (15 seconds, as standard) |
| Reverse Power | Reverse power limit value: if the limit value is exceeded, the generator switch is disconnected with a time delay (6 seconds as standard) |
| Short circuit | Short circuit: if exceeded, the generator switch is disconnected with a short time delay (0.2–0.6 seconds) |
| Delay Time 1 (Current 1) | The delay time starts after the limit value "Current 1" has been exceeded, and disconnects the unimportant loads, stage 1, when the time has elapsed |
| Delay Time 2 (Current 1) | The delay time starts after the limit value "Current 1" has been exceeded, and disconnects the unimportant loads, stage 2, when the time has elapsed |
| Delay Time 3 (Current 1) | The delay time starts after the limit value "Current 1" has been exceeded, and disconnects the unimportant loads, stage 3, when the time has elapsed |
| Delay Time 3.1 (Current 3) | The delay time starts after the limit value "Current 3" has been exceeded, and disconnects the unimportant loads, stages 1–3, when the time has elapsed |
| Delay Time 4 (Current 4) | The delay time starts after the limit value "Delay Time 4" has been exceeded, and switches off the generator switch after the time has elapsed |
| Delay Time 5 (Reverse Power) | The delay time starts after the limit value "Delay Time 5" has been exceeded, and switches off the generator switch after the time has elapsed |

-continued

| Limit values + Delay times | |
|---|---|
| Parameter | Meaning |
| Delay Time 6 (Short Circuit) | The delay time starts after the limit value "Delay Time 6" has been exceeded, and switches off the generator switch after the time has elapsed |

| Internal Parameters | |
|---|---|
| Parameter Limits | Meaning |
| Sync.Short-Pulse Length | Short pulse length synchronization |
| Short-Pulse Pulse Ratio | Factor for setting the ratio between the pulse-pause time of the short pulses for synchronization. If the setting is 100%, the pulse/pause time is equal. If the setting is 50%, the pause time is 50% of the pulse time |
| Sync.Long-Pulse Length | Long pulse length synchronization |
| Long-Pulse Pulse Ratio | Factor for setting the ratio between the pulse/pause time of the short pulses for synchronization. If the setting is 100%, the pulse/pause time is equal. If the setting is 50%, the pause time is 50% of the pulse time |
| Frequ. Limit Switching from Permanent to Long Pulse Length | Limit value switching from continuous to long pulse |
| Frequ. Limit Switching from Long to Short Pulse Length | Limit value switching from long pulse to short pulse |

| Sync.Enable Limits | |
|---|---|
| Parameter Limits | Meaning |
| Sync.Diff.Frequency Limit | Difference between generator and power supply system frequency. If the limit value is exceeded, then the adjusting pulses are inhibited. |
| Sync.Diff.Voltage Limit | Voltage difference between generator voltage and power supply system voltage. If the limit value is exceeded, then the connection of the generator switch and the output of adjusted pulses are inhibited. |
| Sync.Connecting Limit | Difference between generator and power supply system frequency where synchronization is in fact still possible. If the limit value is exceeded, then switching on the generator switch is inhibited. However, adjusting pulses are still output for frequency adjustment |
| Pre-Switching Time | Calculated time between outputting the generator switching-on command and the zero crossing of the beat voltage |
| Switch ON Pulse Length | Length of the generator switching-on pulse |

| U + I Transformation | |
|---|---|
| Parameter | Meaning |
| Primary Voltage Transformer | Rated voltage of the power supply system |
| Primary Current Transformer | Rated voltage of the generator |

Extras

Trigger Controlling

A Genop 71 must be connected for activation of this function. This menu allows the limit-value tripping operations for Current 1–4, reverse power and short circuit to be suppressed.

Generator Frequency

The generator frequency can be adjusted here by clicking the mouse.

Precondition:

The voltage difference (power supply system/generator) is less than the value set in the "Sync.Diff.Voltage Limit"

The frequency difference (power supply system/generator) is less than the value set in the "Sync.Diff.Frequency Limit".

PC Interface

The number of the serial interface (COM Ports 1–3) can be selected.

About GENOP 71

This menu item shows the version data of the parameter program and the firmware for the Genop 71 that is connected. The menus "Show Data", "Control-Signals" and "Adjustments" are provided only for work at the manufacturer's premises.

Generator Protection

Overcurrent Time Protection

The three generator currents IL1, IL2, IL3 are detected by measurement transducers. The extreme values of the three currents are monitored for limit values.

The following table shows the generator protection function:

| Generator current | | | | | |
|---|---|---|---|---|---|
| Limit value (GW) | I in % | Delay time sec. | Relay GW1 | Relay GW2 | Relay GW3 | Relay generator switch off |
| GW1 | 100 | 5 s | x | | | |
| | | 10 s | | x | | |
| | | 15 s | | | x | |
| GW3 | 120 | 1 s | x | x | x | |
| GW4 | 110 | 30 s | | | | x |

| Reverse power | | | | | |
|---|---|---|---|---|---|
| Limit value | P in % | Delay time sec. | Relay GW1 | Relay GW2 | Relay GW3 | Relay generator switch off |
| GW5 | 0–100 | 6 s | | | | x |

| Short circuit | | | | | |
|---|---|---|---|---|---|
| Limit value | I in % | Delay time sec. | Relay GW1 | Relay GW2 | Relay GW3 | Relay generator switch off |
| GW6 | >300 | 0.1–1.5 s | | | | x |

Figure 7:
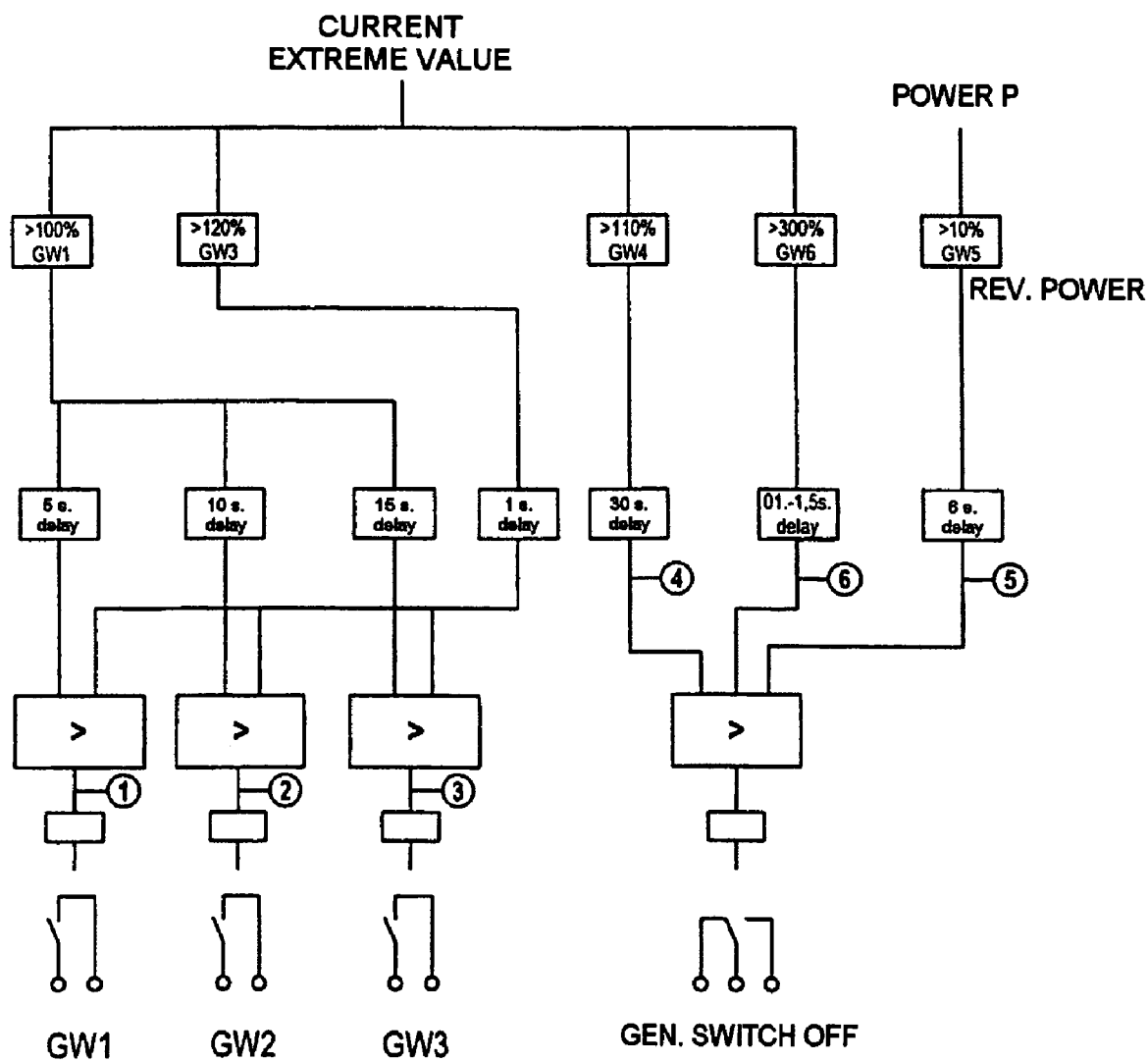
FIG. 7 illustrates the functional relationship for generator protection.

FIG. 7 shows the functional relationship for generator protection.

Figure 8:
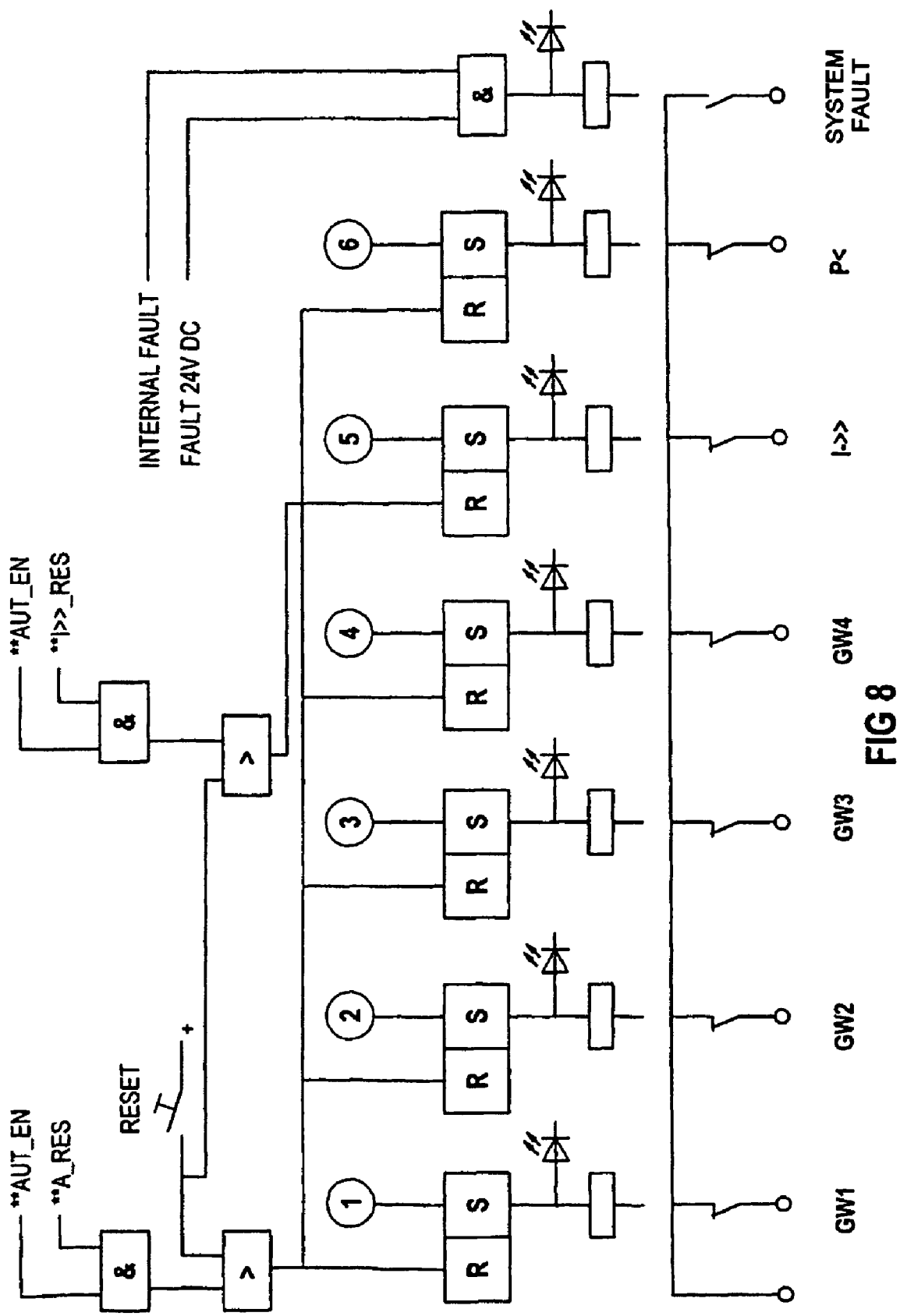
FIG. 8 illustrates the functional relationship for disturbance evaluation.

FIG. 8 shows the functional relationship for disturbance evaluation.

The disturbance message signals which occur for generator protection are maintained until they are acknowledged by the high-level control system, or are canceled by a RESET. The failure of the 24V battery voltage or a defect in the computer results in unavoidable signaling by tripping of the "System Defect" relay.

Synchronization

Frequency Adjustment

Once the machine set has been started, the power supply system frequency is approached first of all with continuous adjustment commands, followed by long and short pulses. The comparison as to whether the power supply system frequency is greater than or less than the generator frequency is carried out in the GENOP 71 generator protection and synchronization device.

If f generator is <f power supply system, the signal "1" appears at the "HIGHER" output. If f generator is >f power supply system, the signal "1" appears at the "LOWER" output. The length of the HIGHER/LOWER adjusting pulses can be changed on the control panel.

Beat Voltage Detection and Evaluation

The beat voltage which is obtained from the synchronization device is evaluated for synchronization of the generator switch. The beat voltage is produced by comparing the power supply system voltage and the generator voltage. The gradient of the beat voltage changes in a corresponding manner to the difference between the generator frequency and the power supply system frequency. The gradient of the beat voltage curve as obtained from the measured values is evaluated, and the switch-on command is produced with the appropriate lead.

Lead

The lead time (time between the switch-on command and the closing of the generator switch) can be set on the control panel, on the basis of the generator switch data.

The following table shows the permissible lead times in the ratio of the generator frequency to the busbar frequency.

| Generator/busbar n difference frequency [HZ] | Lead time max. [ms] |
|---|---|
| 0.2 | 456 |
| 0.3 | 276 |
| 0.4 | 192 |
| 0.5 | 204 |
| 0.6 | 146 |
| 0.7 | 128 |
| 0.8 | 88 |
| 0.9 | 60 |
| 1.0 | 58 |

Difference Frequency

The difference frequency between the power supply system frequency and the generator frequency is likewise derived from the beat voltage. If the difference frequency is >0.5 Hz, synchronization is inhibited. If the difference frequency is >10 Hz, the HIGHER/LOWER adjusting pulses are inhibited entirely, since this indicates that a machine set fault must be present.

Frequency Tuning

If the generator frequency is made very close to the power supply system frequency by way of a tuning command, so that continuous beating occurs (power supply system frequency and generator frequency are the same), then this results in an adjusting pulse and a greater Delta-f is produced in order to allow rapid synchronization. This is done by evaluating the beat frequency zero crossings. If no zero crossing occurs in the beat frequency within a specific time, another adjusting pulse is produced.

Automatic synchronization/synchronization in the local semiautomatic mode and synchronization in the manual mode are described in Section 4.

Adjustable Values for Synchronization

Some values for synchronization can be adjusted via the OP7. If the generator protection device/measurement transducer GENOP 71 is used on its own, these values can be set via a PC program.

The following values can be set.
Limit value for the difference frequency for enabling the adjusting pulses (for example 10 Hz)
Limit value for the difference frequency for switching from continuous pulse to long pulse (for example 1.5 Hz)
Limit value for the difference frequency for switching from long pulse to short pulse (for example 0.6 Hz)
Limit value for the difference frequency for switching the generator switch at a zero crossing (for example 0.5 Hz)
Pulse length of the short pulses
Pulse length of the long pulses
Lead time to reach the zero crossing of the beat voltage (switch-on time for the generator switch)
Pulse length of the switch-on command for the generator switch
Trip delay time for initiating frequency tuning
Pulse length of the "Higher/Lower" pulses for frequency tuning
Limit value for the difference between the generator voltage and the power supply system voltage for inhibiting the adjustment process and connection of the generator switch Voltage Difference Monitoring The connection of the generator switch is blocked if the voltage difference is too great. If the voltage difference is greater than the limit value which can be selected, then the connection of the generator switch and the outputting of the adjusting pulses are inhibited. The fact that the limit value has been exceeded is signaled by an LED on the front face of the device.

Optionally, a voltage regulator can be provided in the Simatic-S7, which outputs higher/lower adjusting pulses to the voltage regulator for the generator.

Figure 9:
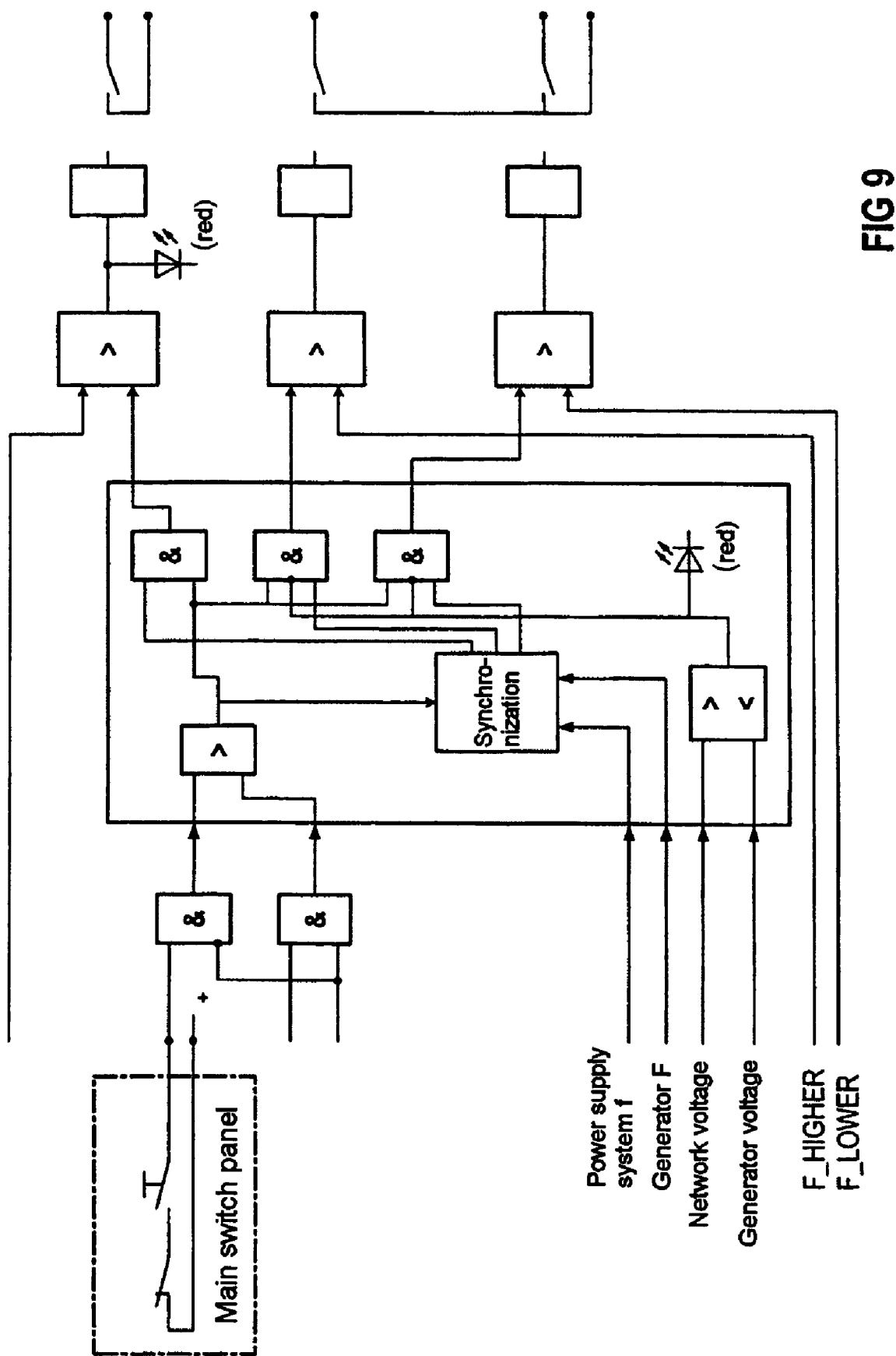
FIG. 9 illustrates the functional procedures for synchronization.

FIG. 9 shows the functional procedures for synchronization

| Meaning of the parameters: | |
| --- | --- |
| BR_ON | Switch ON signal |
| SYN_EN | Enable synchronization |
| AUT_EN | Automatic mode |
| F_HIGHER | Frequency adjusting pulse, higher |
| F_LOWER | Frequency adjusting pulse, lower |

Figure 10:
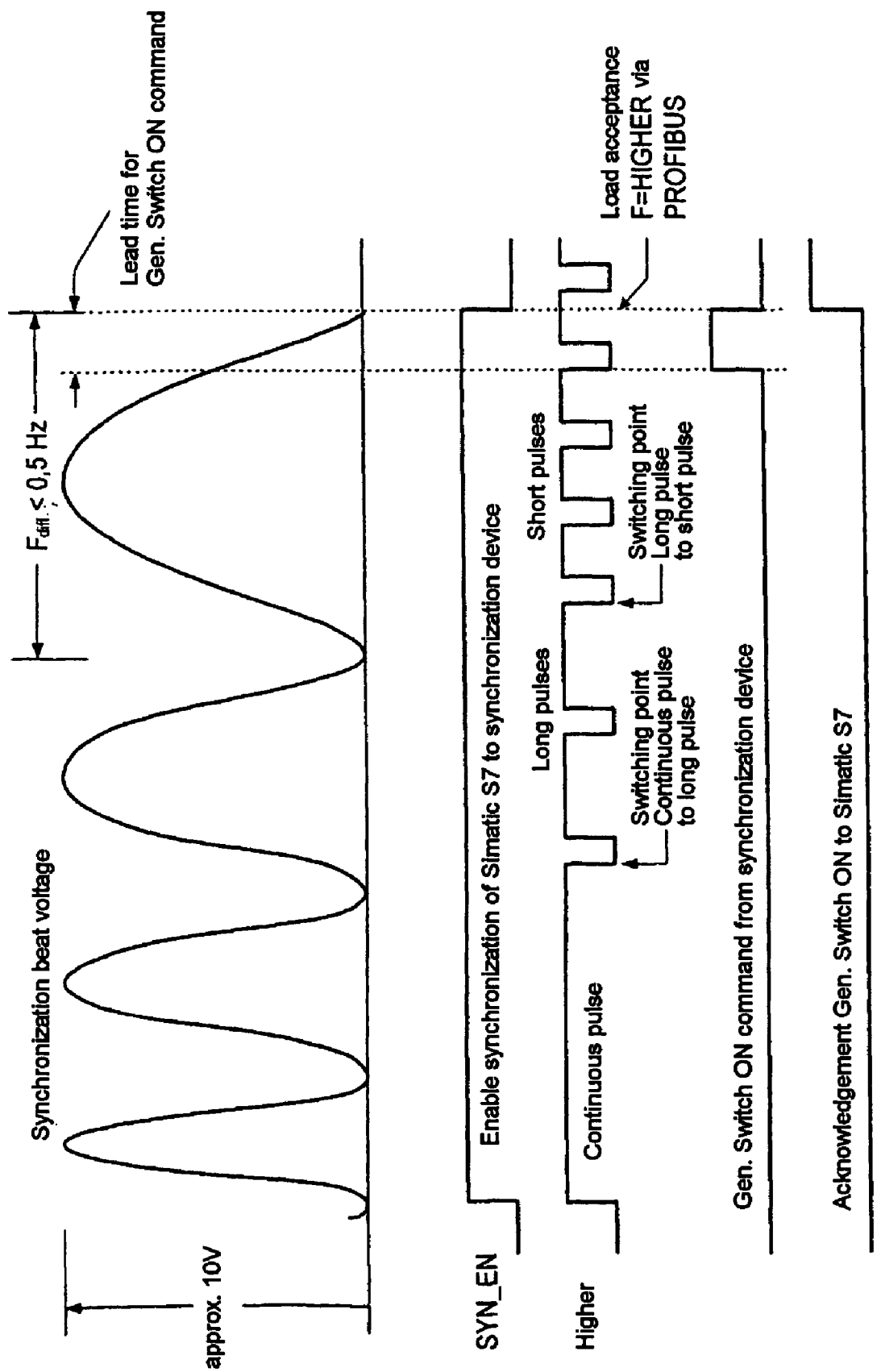
FIG. 10 illustrates the principle of synchronization.

FIG. 10 shows the principle of synchronization.

24V DC/24V DC Isolating Transformer

Object

The 24V DC/24V DC isolating transformer has the following functions:

1.) The connected components can be operated over a wider frequency range than is possible on the basis of the technical data for the individual components.

2.) The connected components are DC-decoupled from the marine vessel battery. The 24V DC supply voltage can be grounded downstream from the isolating transformer, and this has major advantages for disturbance protection.

The following components are fed from the power supply:
The SIMATIC S7 associated with the machine set
All the signal sensors which are associated with the machine set and the control system
The digital outputs from the SIMATIC S7 (operation of lamps or coupling relays)
The generator protection device/measurement transducer
The OP7 control panel The power supply for the generator protection device/measurement transducer is designed in a redundant manner, that is to say in addition to the feed from the isolating transformer (and thus from the higher-level battery power supply), this device has a feed from a power supply unit, which is fed from the respective generator.

The voltage supply for the undervoltage coil for the generator switch as well as the delay time is not included in the PMA 71 but must be installed in the switch panel.

Mechanical design:

The 24V DC/24V DC isolating transformer is mounted on the mounting plate by way of a number of screws. It may be mounted horizontally or vertically. Input and output voltage are connected via Faston pins.

Figure 11:
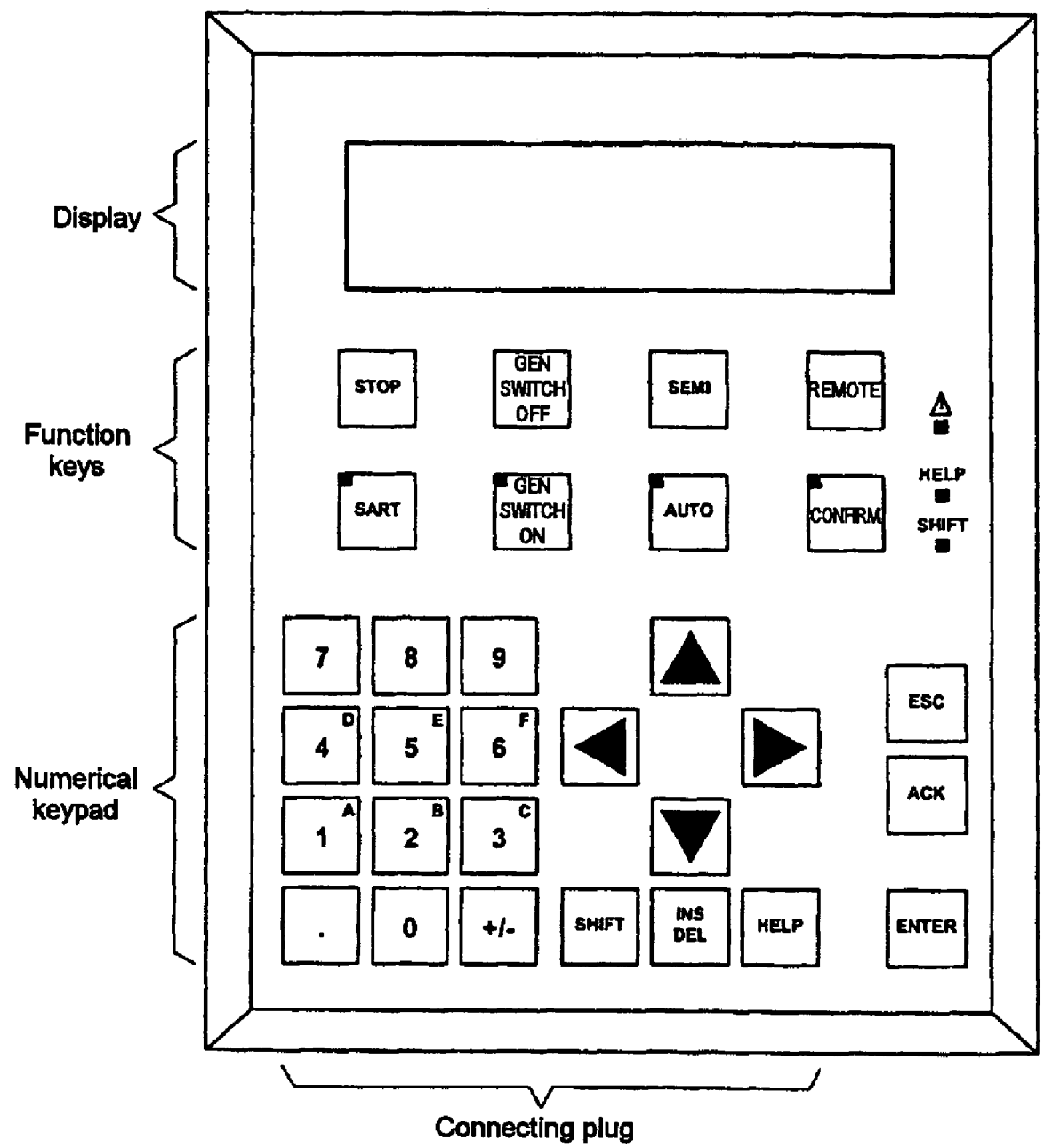
FIG. 11 illustrates the standard OP7 control panel (BT).

FIG. 11 shows the standard OP7 control panel (BT).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A marine electrical system for a marine vessel, comprising:
system components; and
standard modules, wherein the system components are adapted to be controlled and regulated by the standard modules, wherein the standard modules operate digitally in all operating states, and wherein each of the standard modules are provided only for controlling and regulating one of the system components.

2. The marine electrical system as claimed in claim 1, wherein the respective standard modules which operate digitally and are provided only for controlling and regulating one of the system components are connected via a bus system.

3. The marine electrical system as claimed in claim 2, wherein the bus system is a Profibus (Process Field Bus) system.

4. The marine electrical system as claimed in claim 2, wherein components of the marine electrical system include at least one of standard switch panels and standard switchgear cabinets.

5. The marine electrical system as claimed in claim 1, further comprising programmable logic controllers.

6. The marine electrical system as claimed in claim 5, wherein the marine electrical system is adapted to be programmed at any time.

7. The marine electrical system as claimed in claim 5, wherein the programmable logic controllers include Siemens SIMATIC S7 programmable logic controllers.

8. The marine electrical system as claimed in claim 5, wherein components of the marine electrical system include at least one of standard switch panels and standard switchgear cabinets.

9. The marine electrical system as claimed in claim 1, further comprising control and monitoring appliances, adapted to be run using Windows.

10. The marine electrical system as claimed in claim 1, wherein components of the marine electrical system include at least one of standard switch panels and standard switchgear cabinets.

11. The marine electrical system as claimed in claim 1, further comprising a power generator automatic system, a control automatic system, a regulation automatic system and a switching automatic system.

12. The marine electrical system as claimed in claim 11, wherein the power generator automatic system is designed to optimize the power generation on a financial basis.

13. The marine electrical system as claimed in claim 1, further comprising generator protection functions.

14. The marine electrical system as claimed in claim 1, further comprising generator synchronization appliances.

15. The marine electrical system as claimed in claim 1, further comprising control panels for control and observation, measurement converters and isolating transformers.

16. The marine electrical system as claimed in claim 1, wherein the marine electrical system is designed such that a choice of operating modes is provided for at least one of individual operation and group operation of the generators.

17. The marine electrical system as claimed in claim 1, wherein the system components are adapted to be controlled and regulated by the standard modules in the form of generators, electrical loads and an on-board power supply system with switchgear assemblies, and wherein the marine electrical system ensures that adequate electrical power is provided in all operating states of the ship.

18. The marine electrical system as claimed in claim 17, further comprising programmable logic controllers.

19. The marine electrical system as claimed in claim 18, wherein the programmable logic controllers include Siemens SIMATIC S7 programmable logic controllers.

20. The marine electrical system as claimed in claim 18, wherein the marine electrical system is adapted to be programmed at any time.

21. The marine electrical system as claimed in claim 19, wherein the marine electrical system is adapted to be programmed at any time using a programming language Step 7.

22. The marine electrical system as claimed in claim 17, wherein components of the marine electrical system include at least one of standard switch panels and standard switchgear cabinets.

23. The marine electrical system as claimed in claim 17, further comprising a power generator automatic system, a control automatic system, a regulation automatic system and a switching automatic system.

24. The marine electrical system as claimed in claim 23, wherein the power generator automatic system is designed to optimize the power generation on a financial basis.

25. The marine electrical system as claimed in claim 17, further comprising generator protection functions.

26. The marine electrical system as claimed in claim 17, further comprising generator synchronization appliances.

27. The marine electrical system as claimed in claim 17, further comprising control panels for control and observation, measurement converters and isolating transformers.

28. The marine electrical system as claimed in claim 17, wherein the marine electrical system is designed such that a choice of operating modes is provided for at least one of individual operation and group operation of the generators.

* * * * *